US011409294B2

(12) United States Patent
Mitomo et al.

(10) Patent No.: US 11,409,294 B2
(45) Date of Patent: *Aug. 9, 2022

(54) MOBILE BODY, INFORMATION PROCESSOR, MOBILE BODY SYSTEM, INFORMATION PROCESSING METHOD, AND INFORMATION PROCESSING PROGRAM

(71) Applicant: Sony Corporation, Tokyo (JP)

(72) Inventors: Toshimoto Mitomo, Tokyo (JP); Kazutoshi Serita, Tokyo (JP)

(73) Assignee: Sony Corporation, Tokyo (JP)

( * ) Notice: Subject to any disclaimer, the term of this patent is extended or adjusted under 35 U.S.C. 154(b) by 35 days.

This patent is subject to a terminal disclaimer.

(21) Appl. No.: 16/939,945

(22) Filed: Jul. 27, 2020

(65) Prior Publication Data
US 2021/0004008 A1 Jan. 7, 2021

Related U.S. Application Data

(63) Continuation of application No. 15/750,951, filed as application No. PCT/JP2016/072634 on Aug. 2, 2016, now Pat. No. 10,761,533.

(30) Foreign Application Priority Data

Aug. 14, 2015 (JP) .............. JP2015-160051

(51) Int. Cl.
*G05D 1/02* (2020.01)
*G08G 1/0968* (2006.01)
(Continued)

(52) U.S. Cl.
CPC .............. *G05D 1/0212* (2013.01); *B25J 5/00* (2013.01); *G01C 21/26* (2013.01); *G05D 1/0038* (2013.01);
(Continued)

(58) Field of Classification Search
CPC .. G05D 1/0212; G05D 1/0038; G05D 1/0246; G05D 1/0202; G05D 1/0088;
(Continued)

(56) References Cited

U.S. PATENT DOCUMENTS 8,725,330 B2 * 5/2014 Failing ................ B60L 3/00
701/22
9,056,676 B1 * 6/2015 Wang ................ B64F 1/00
(Continued)

FOREIGN PATENT DOCUMENTS

JP 07-83678 A 3/1995
JP 2007-233751 A 9/2007
(Continued)

OTHER PUBLICATIONS

U.S. Appl. No. 15/750,951, filed Feb. 7, 2018, Mitomo et al.
(Continued)

*Primary Examiner* — Masud Ahmed
(74) *Attorney, Agent, or Firm* — Wolf, Greenfield & Sacks, P.C.

(57) ABSTRACT

A mobile body includes: an imaging unit; a movement mechanism that moves itself; a wireless communication unit that performs wireless communication; and an information generator that generates, on a basis of external information received from outside by the wireless communication unit, route guidance information for use in allowing the movement mechanism to move itself.

20 Claims, 14 Drawing Sheets

(51) Int. Cl.
| | |
|---|---|
| *B25J 5/00* | (2006.01) |
| *G01C 21/26* | (2006.01) |
| *G05D 1/00* | (2006.01) |
| *G06V 20/10* | (2022.01) |
| *B64C 39/02* | (2006.01) |
| *H04N 7/14* | (2006.01) |

(52) U.S. Cl.
CPC ......... *G05D 1/0088* (2013.01); *G05D 1/0202* (2013.01); *G05D 1/0246* (2013.01); *G08G 1/0968* (2013.01); *B64C 39/024* (2013.01); *B64C 2201/127* (2013.01); *B64C 2201/141* (2013.01); *G05D 1/0274* (2013.01); *G05D 1/0278* (2013.01); *G05D 2201/0211* (2013.01); *G05D 2201/0213* (2013.01); *G05D 2201/0217* (2013.01); *G06V 20/10* (2022.01); *H04N 7/141* (2013.01); *Y10S 901/01* (2013.01)

(58) Field of Classification Search
CPC ... G05D 2201/0217; G05D 2201/0213; G05D 2201/0211; G05D 1/0278; G05D 1/0274; G01C 21/26; B25J 5/00; G08G 1/0968; Y10S 901/01; H04N 7/141; G06K 9/00664; B64C 2201/141; B64C 2201/127; B64C 39/024
USPC .......................................................... 701/22
See application file for complete search history.

(56) References Cited

U.S. PATENT DOCUMENTS

| | | | |
|---|---|---|---|
| 9,139,310 B1* | 9/2015 | Wang | ................. B64F 1/36 |
| 2006/0116816 A1 | 6/2006 | Chao et al. | |
| 2010/0241289 A1 | 9/2010 | Sandberg | |
| 2011/0054689 A1 | 3/2011 | Nielsen | |
| 2013/0041548 A1 | 2/2013 | Krautter et al. | |
| 2013/0325244 A1 | 12/2013 | Wang et al. | |
| 2015/0077502 A1 | 3/2015 | Jordan et al. | |
| 2016/0039300 A1* | 2/2016 | Wang | ................. B60L 11/1822 244/39 |
| 2016/0231855 A1 | 8/2016 | Bendewald et al. | |
| 2018/0246514 A1 | 8/2018 | Mitomo et al. | |

FOREIGN PATENT DOCUMENTS

| | | |
|---|---|---|
| JP | 2013-242777 A | 12/2013 |
| JP | 2014-016858 A | 1/2014 |
| JP | 2014-048842 A | 3/2014 |
| JP | 2014-182590 A | 9/2014 |
| JP | 2014-219722 A | 11/2014 |
| JP | 2015-125469 A | 7/2015 |
| WO | 2010/044277 | 4/2010 |

OTHER PUBLICATIONS

International Search Report and English translation thereof dated Nov. 1, 2016 in connection with International Application No. PCT/JP2016/072634.
Written Opinion and English translation thereof dated Nov. 1, 2016 in connection with International Application No. PCT/JP2016/072634.
International Preliminary Report on Patentability and English translation thereof dated Mar. 1, 2018 in connection with International Application No. PCT/JP2016/072634.
Extended European Search Report dated Jun. 27, 2019, issued by the EPO in connection with European Application No. 16836973.4.
EPO Communication pursuant to Article 94(3) dated Mar. 23, 2020, in connection with European Application No. 16836973.4.
Japanese Office Action dated Jun. 9, 2020, in connection with Japanese Application No. 2017-535322, and English translation thereof.

* cited by examiner

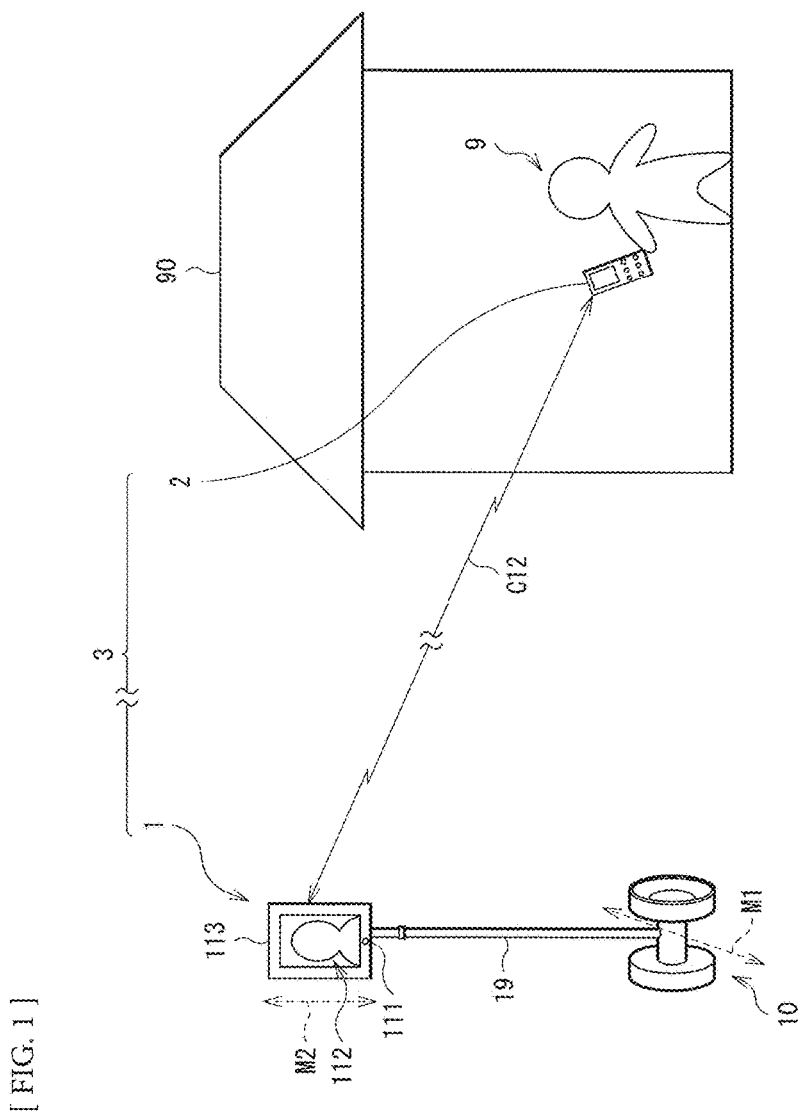
[FIG. 1]

[FIG. 2A]
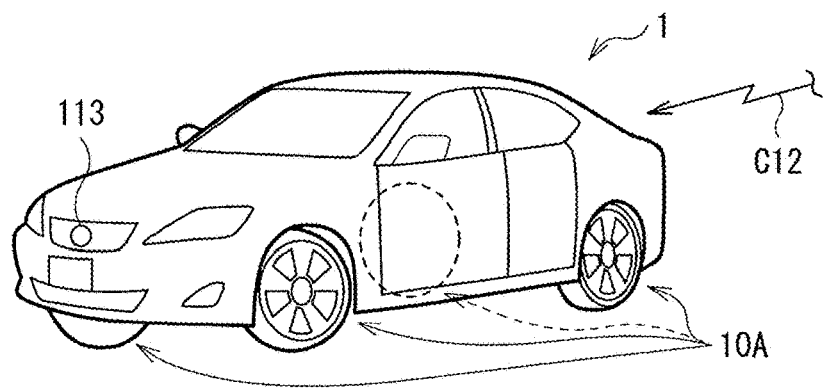
[FIG. 2B]
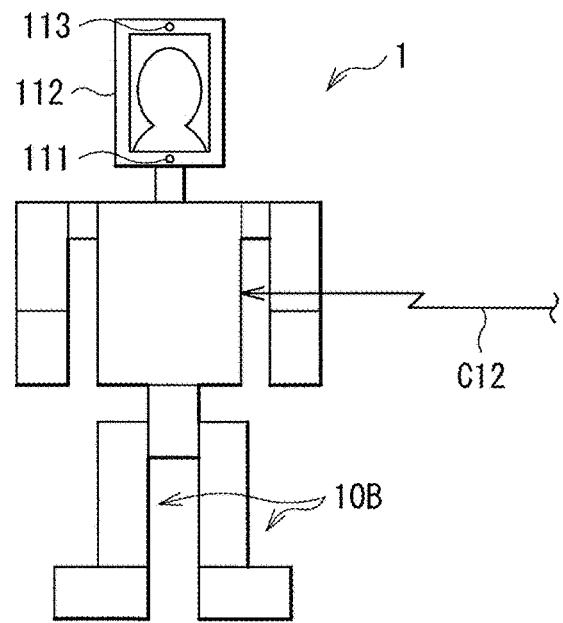
[FIG. 2C]
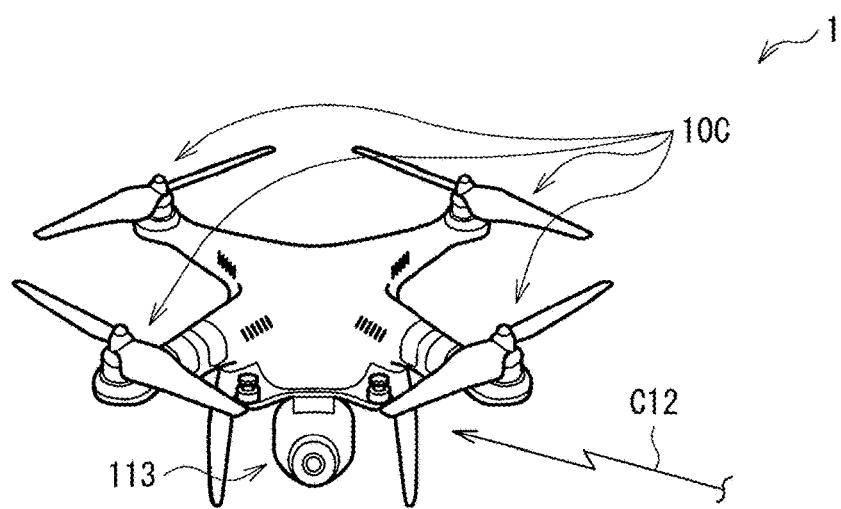

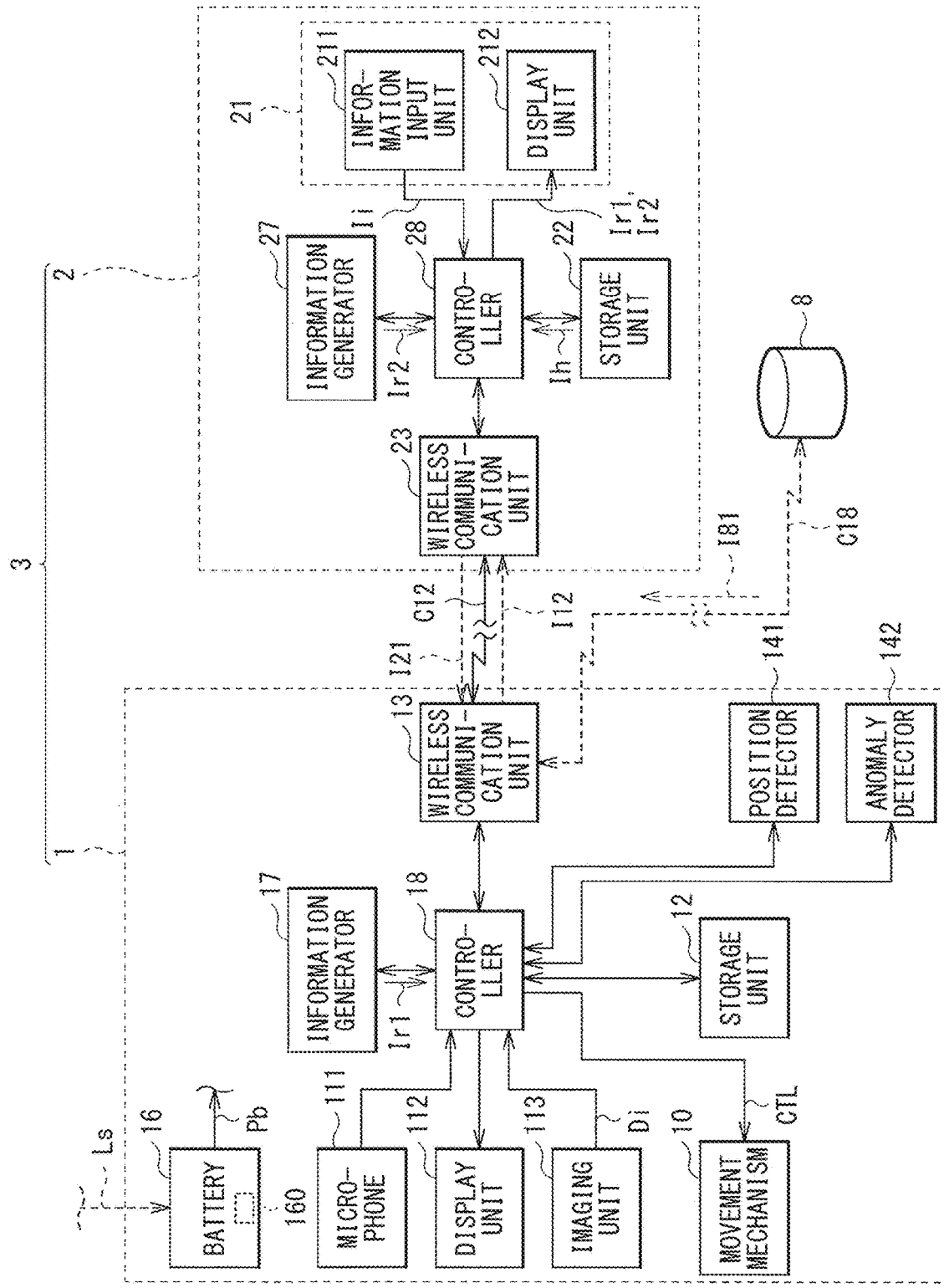
[FIG. 3]

[FIG. 4]
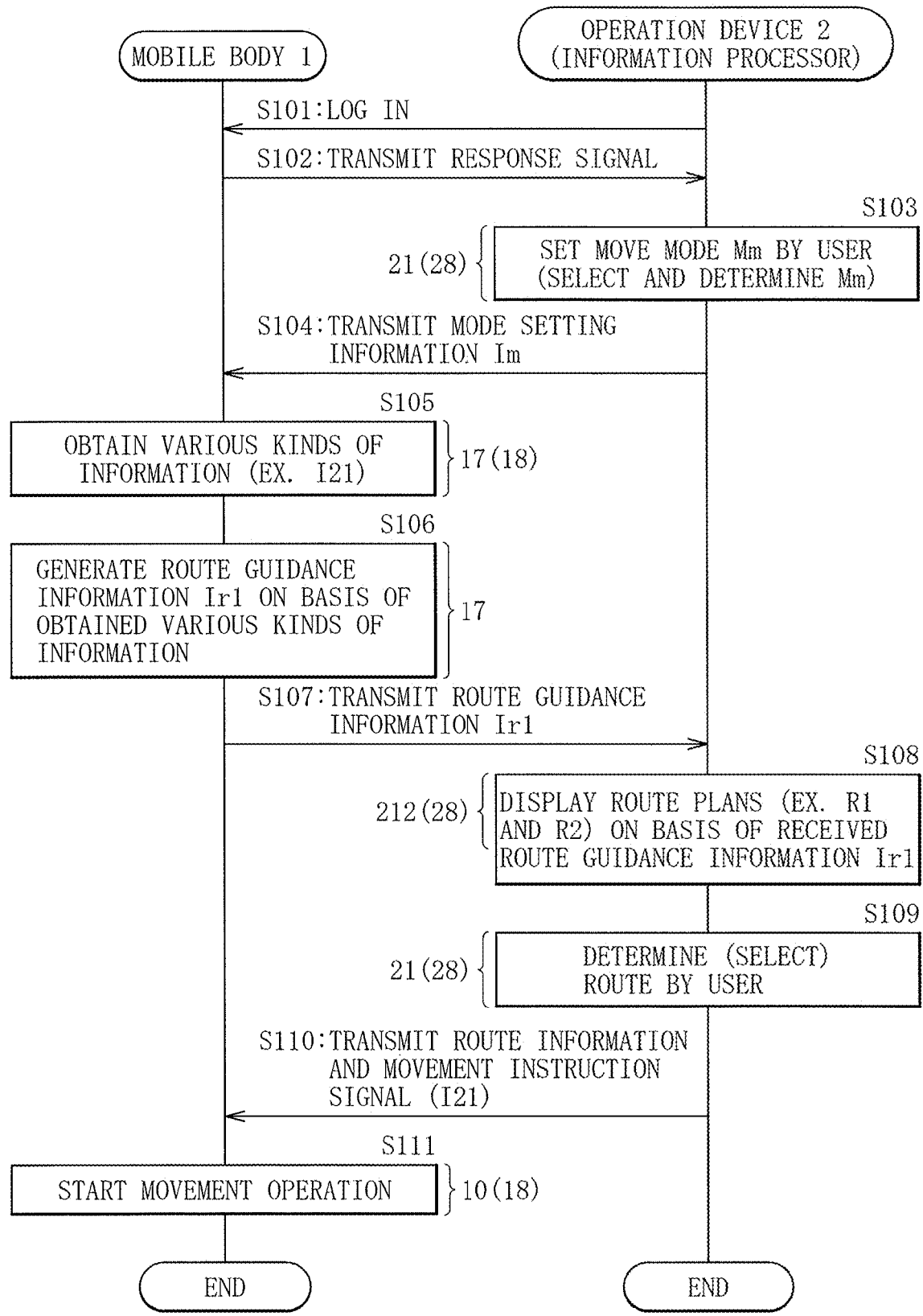

[ FIG. 5 ]
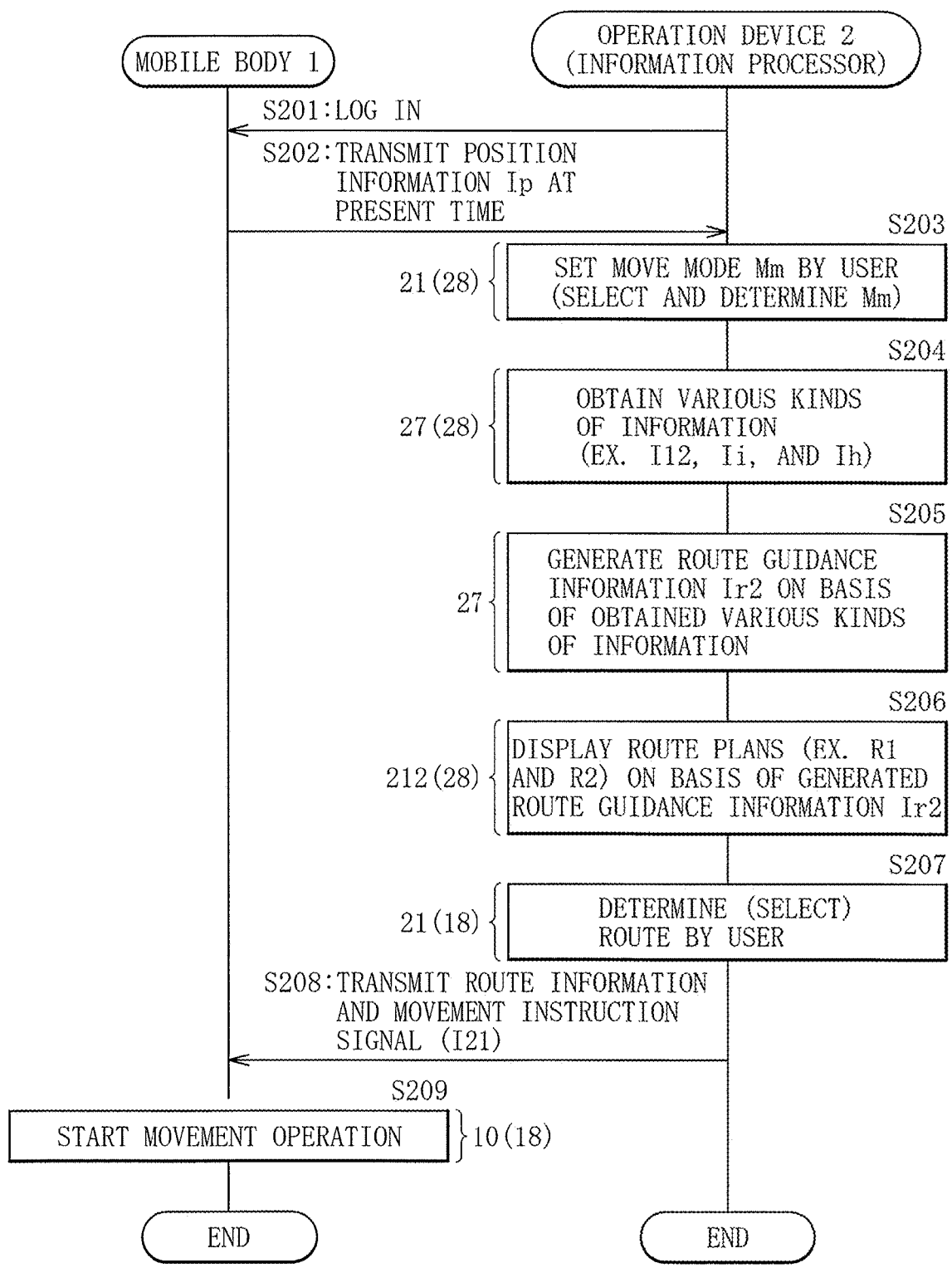

[ FIG. 6 ]

| VARIOUS KINDS OF INFORMATION (TAG INFORMATION) \ MOVE MODE Mm (lm) | | Mode 1 FOR STROLL IN VARIOUS FACILITIES | Mode 2 FOR STROLL DURING TRIP | Mode 3 FOR ATTENDANCE AT BUSINESS MEETING | Mode 4 FOR PATROL AS SECURITY GUARD | Mode 5 FOR AERIAL TOUR | Mode 6 FOR USE AS MONITORING ROBOT |
|---|---|---|---|---|---|---|---|
| It1 | INFORMATION REGARDING GPS OF OPERATION DEVICE | ○ | ○ | | | ○ | |
| It2 | SEARCH HISTORY INFORMATION IN OPERATION DEVICE | ○ | ○ | | | ○ | |
| It3 | WEATHER-RELATED INFORMATION | ○ | ○ | | | ○ | ○ |
| It4 (Imap) | WIDE AREA MAP INFORMATION (SUCH AS INFORMATION REGARDING LEVEL-DIFFERENCE ROUTE) | | ○ | | | ○ | ○ |
| It5 | REMAINING ELECTRIC POWER INFORMATION OF MOBILE BODY | ○ | ○ | ○ | ○ | ○ | ○ |
| It6 | EVALUATION INFORMATION BY OTHER USERS | ○ | ○ | | | ○ | |
| It7 | TIME INFORMATION | ○ | ○ | ○ | ○ | ○ | ○ |
| It8 (Imap) | IN-BUILDING MAP INFORMATION (SUCH AS INFORMATION REGARDING LEVEL-DIFFERENCE ROUTE) | ○ | ○ | ○ | ○ | | ○ |
| It9 | SCHEDULE INFORMATION OF USER | | | ○ | | | |
| It10 | MOVEMENT HISTORY INFORMATION OF MOBILE BODY | | | ○ | | | |
| It11 | ACTION HISTORY INFORMATION OF USER | | | | | | ○ |
| It12 | WIRELESS COMMUNICATION AREA INFORMATION | ○ | ○ | ○ | ○ | ○ | ○ |

[ FIG. 7 ]
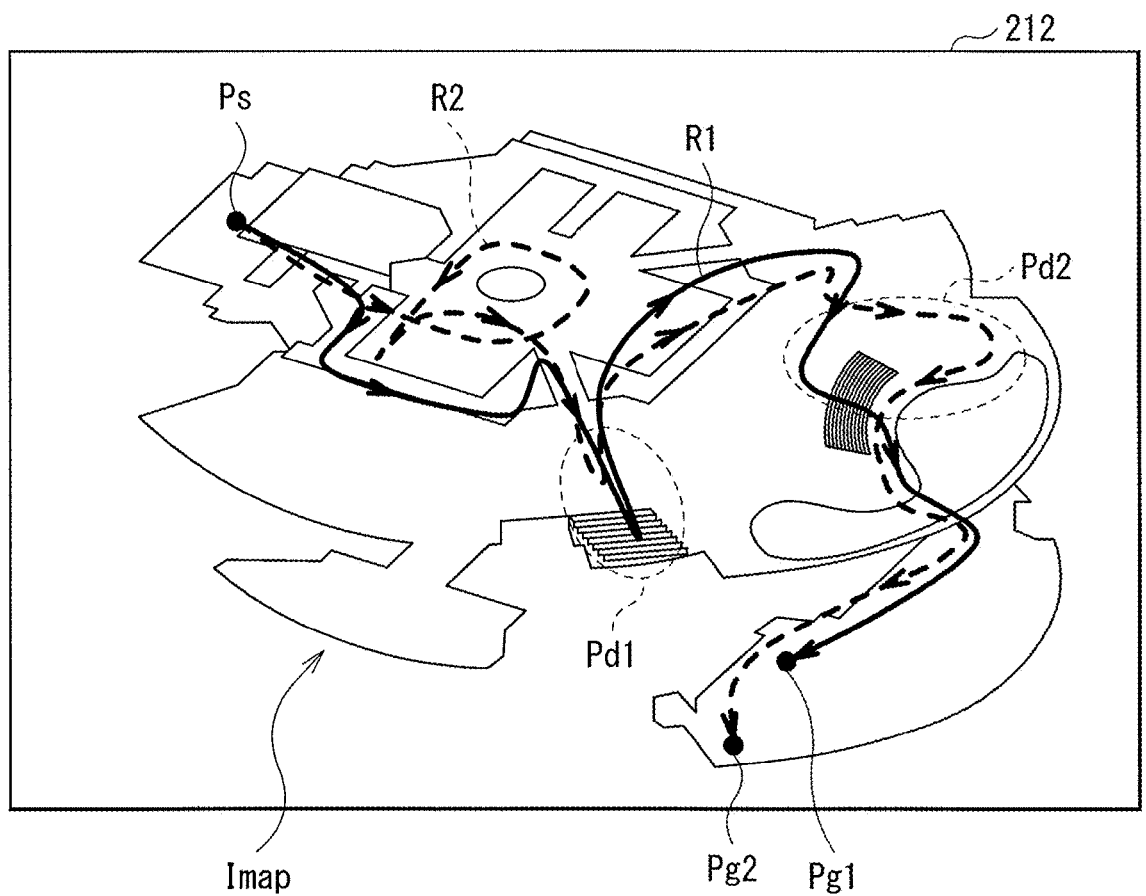

[ FIG. 8 ]
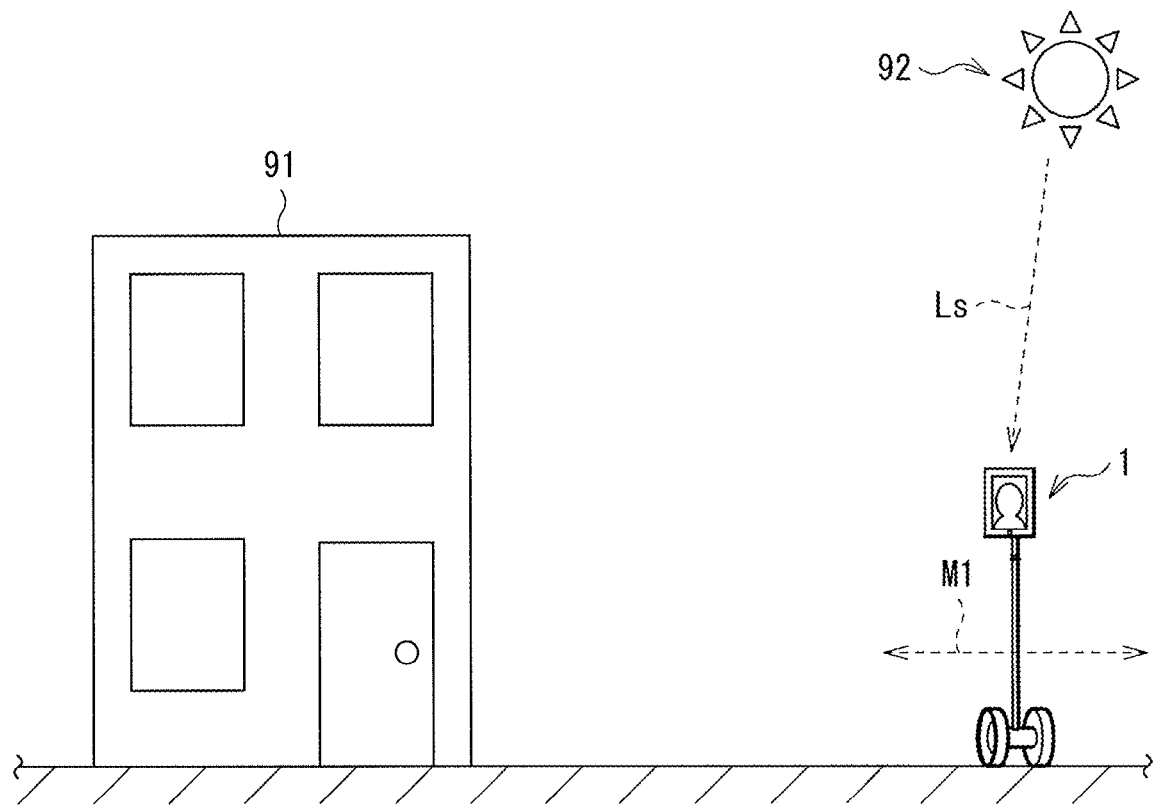
[ FIG. 9 ]
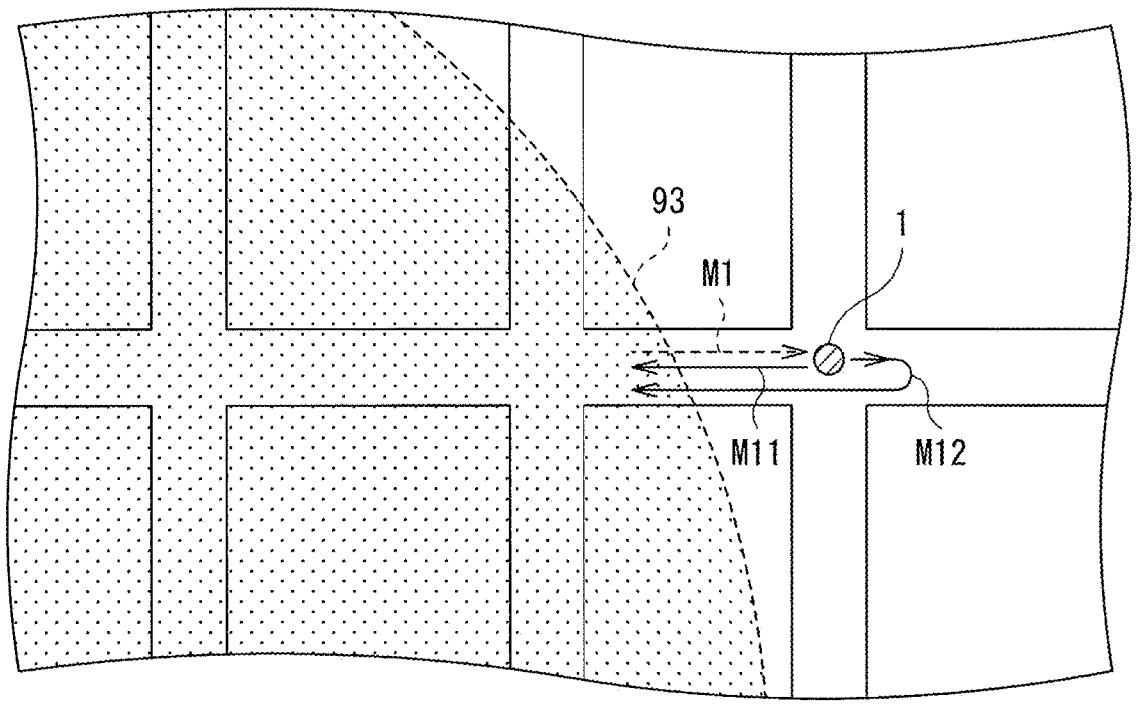

[ FIG. 10 ]
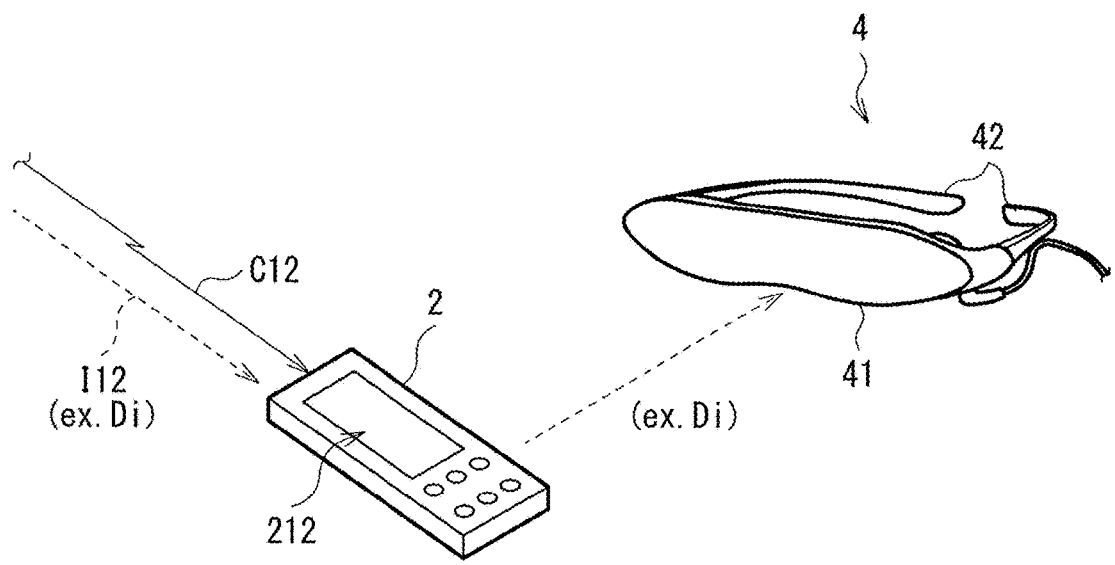
[ FIG. 11 ]
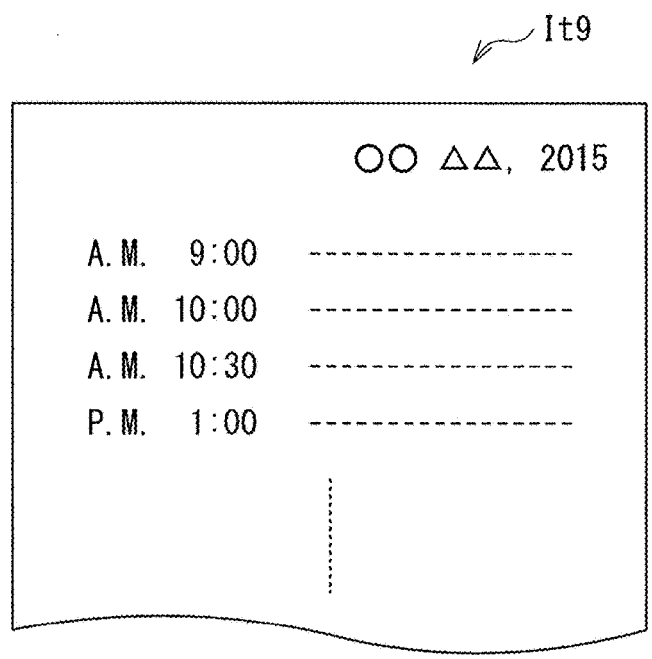

[ FIG. 12 ]
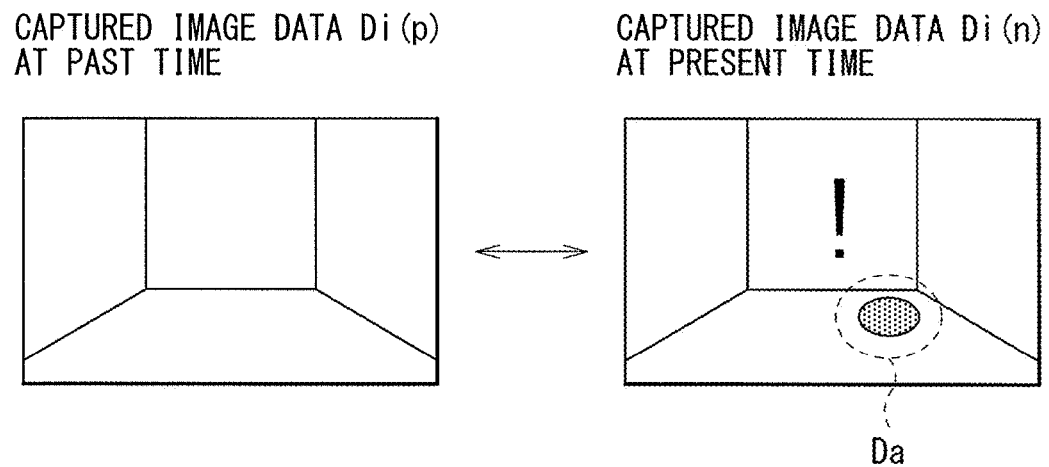
[ FIG. 13 ]
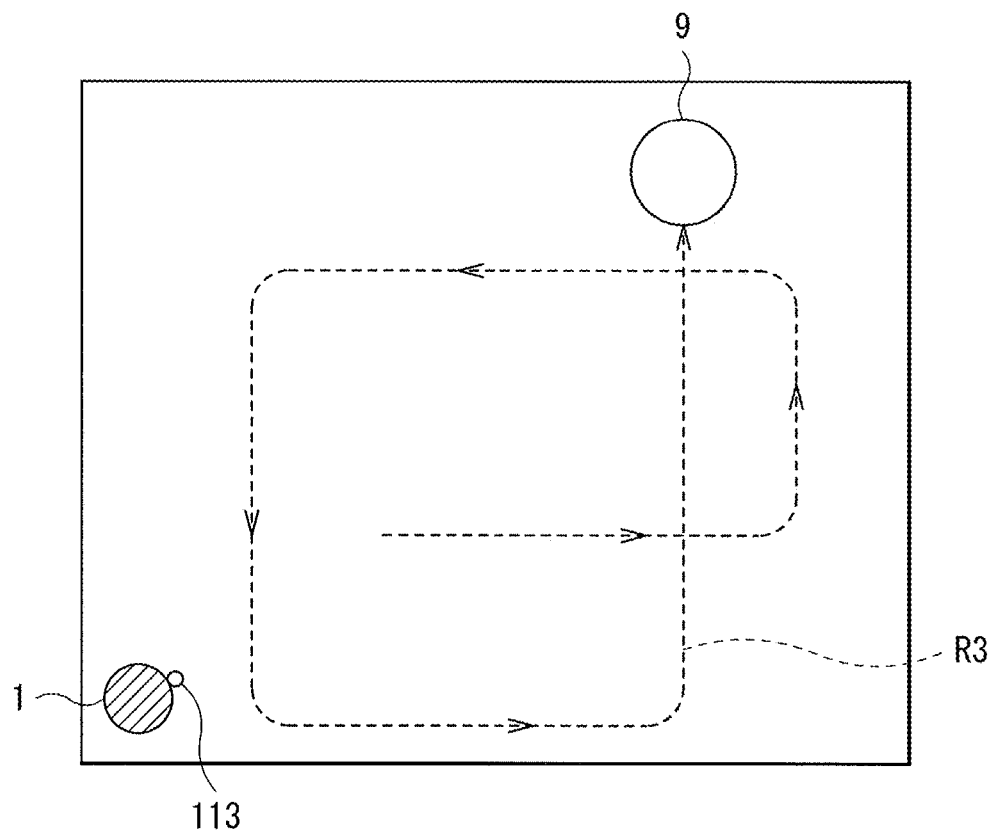

[ FIG. 14 ]
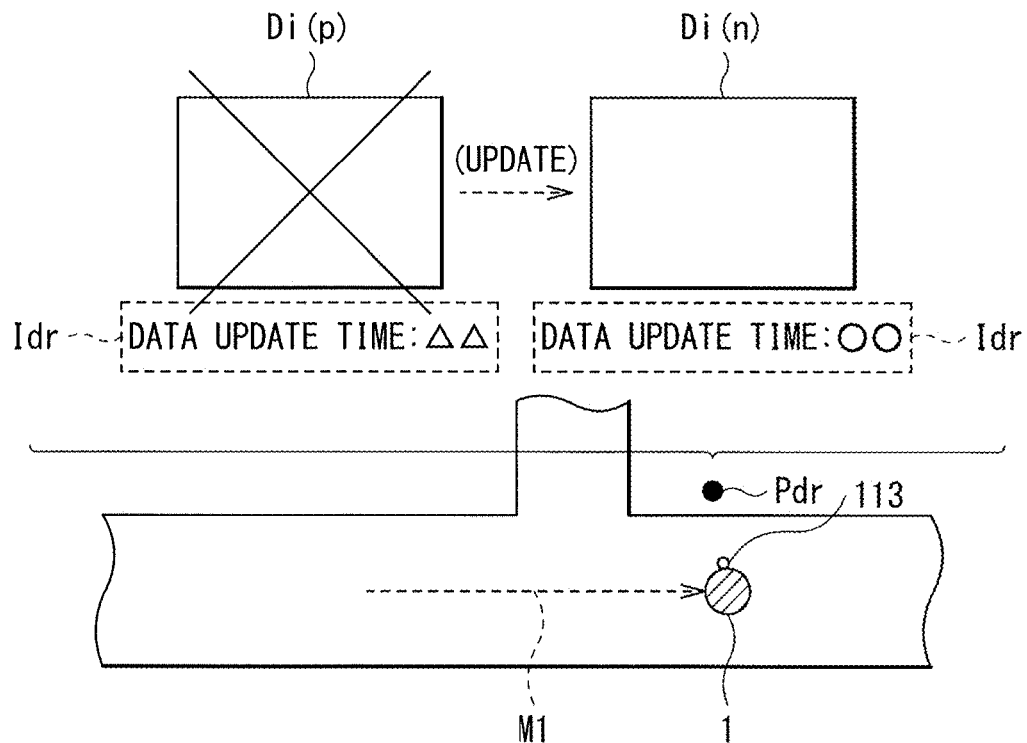
[ FIG. 15 ]
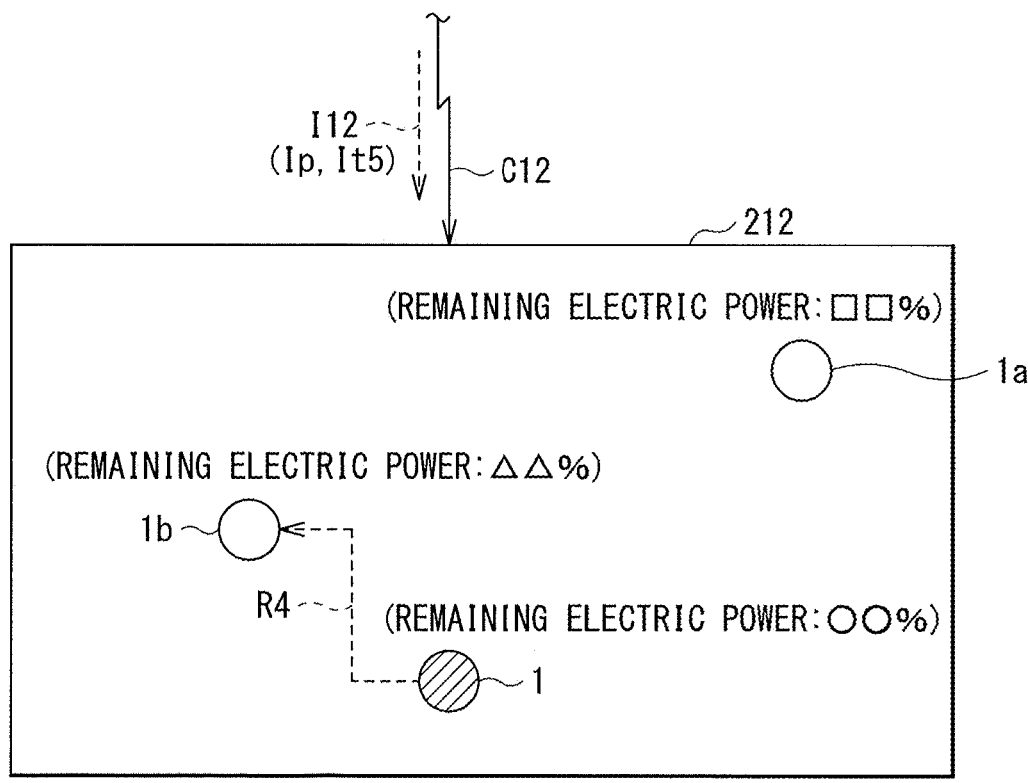

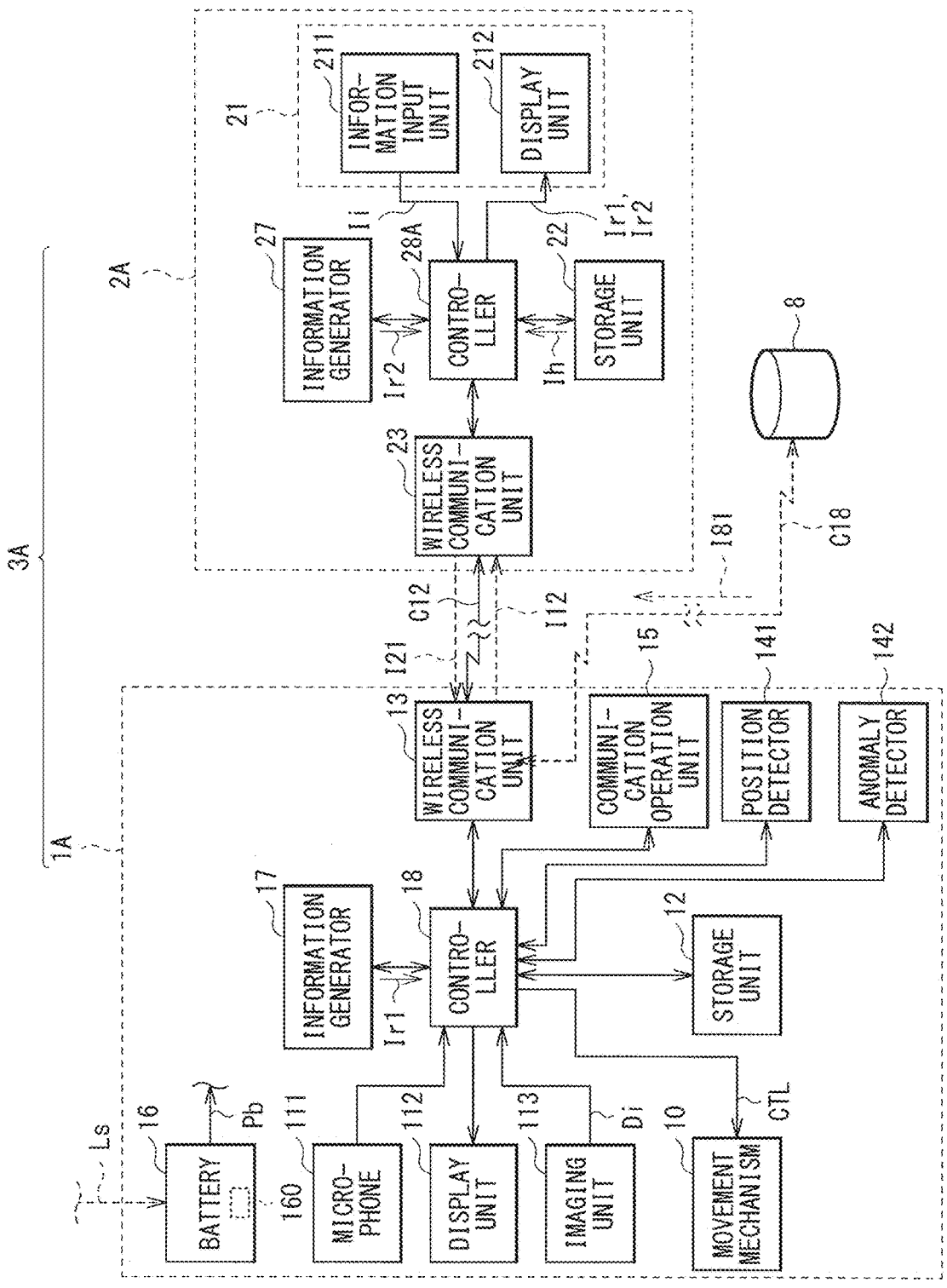
[FIG. 16]

[ FIG. 17 ]
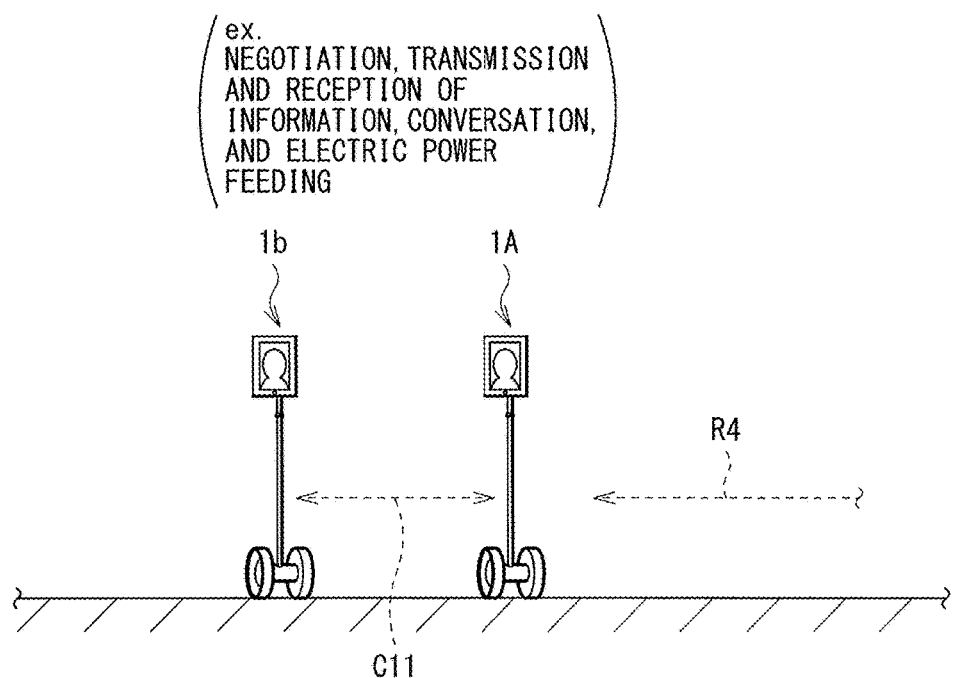
[ FIG. 18 ]
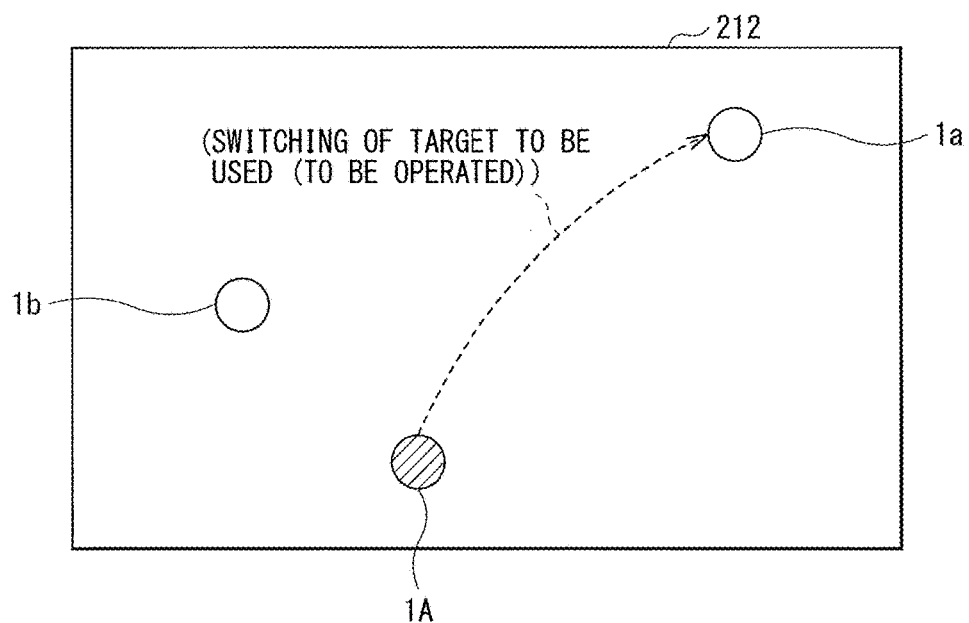

[ FIG. 19 ]
MODIFICATION EXAMPLE 2
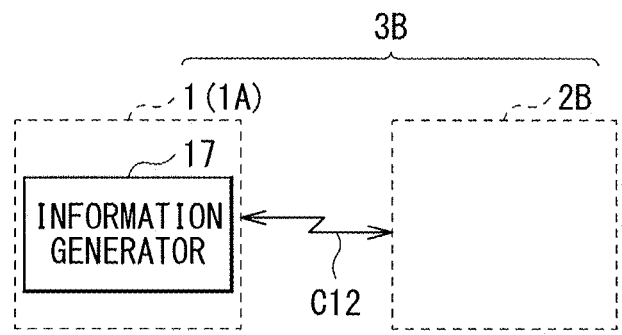
[ FIG. 20 ]
MODIFICATION EXAMPLE 3
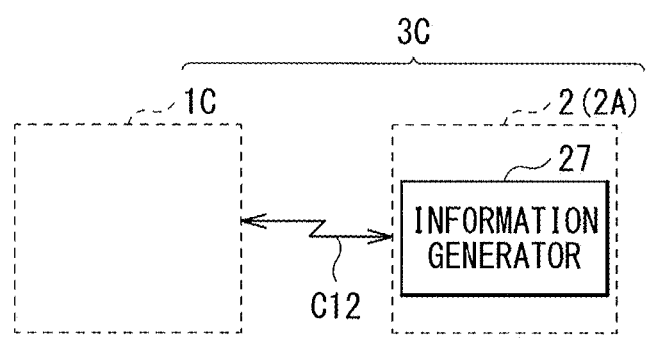

MOBILE BODY, INFORMATION PROCESSOR, MOBILE BODY SYSTEM, INFORMATION PROCESSING METHOD, AND INFORMATION PROCESSING PROGRAM

CROSS-REFERENCE TO RELATED APPLICATIONS

The present application claims the benefit under 35 U.S.C. § 120 as a continuation application of U.S. application Ser. No. 15/750,951, filed on Feb. 7, 2018, now U.S. Pat. No. 10,761,533, which is a U.S. National Stage entry under 35 U.S.C. § 371 of International Application No. PCT/JP2016/072634, filed in the Japan Patent Office on Aug. 2, 2016, which claims priority to Patent Application No. JP2015-160051, filed in the Japan Patent Office on Aug. 14, 2015, each of which is incorporated by reference herein in its entirety.

TECHNICAL FIELD

The present disclosure relates to a mobile body having an imaging unit and a movement mechanism and a mobile body system including such a mobile body and an information processor, and to an information processor, an information processing method, and an information processing program that are applied to such a mobile body system.

BACKGROUND ART

There is technology called "Telepresence" that makes it possible to create a situation that a user is virtually present at a remote site by remotely operating a mobile body (robot) present at the remote site by the user with use of an operation device (for example, an information processor such as a smartphone). Moreover, a robot to which this technology is applied is referred to as "Telepresence Robot". These techniques have been disclosed in, for example, PTL 1, etc.

CITATION LIST

Patent Literature

PTL 1: U.S. patent application publication No. 2013/0325244

SUMMARY OF THE INVENTION

Incidentally, in general, it is demanded to improve user convenience in a system (mobile body system) using such a mobile body. Accordingly, it is desirable to propose techniques to improve user convenience.

It is desirable to provide a mobile body, an information processor, a mobile body system, an information processing method, and an information processing program that make it possible to improve user convenience.

A mobile body according to an embodiment of the present disclosure includes: an imaging unit; a movement mechanism that moves itself; a wireless communication unit that performs wireless communication; and an information generator that generates, on a basis of external information received from outside by the wireless communication unit, route guidance information for use in allowing the movement mechanism to move itself.

A first information processing method according to an embodiment of the present disclosure includes: a first step of receiving external information from outside through wireless communication in a mobile body including an imaging unit and a movement mechanism; and a second step of generating route guidance information for use in moving the mobile body by the movement mechanism on a basis of the external information received in the first step.

A first information processing program according to an embodiment of the present disclosure causes, when executed by a computer in a mobile body, the computer to implement: a first step of receiving external information from outside through wireless communication in the mobile body including an imaging unit and a movement mechanism; and a second step of generating route guidance information for use in moving the mobile body by the movement mechanism on a basis of the external information received in the first step.

In the mobile body, the first information processing method, and the first information program according to the respective embodiments of the present disclosure, the route guidance information for use in moving the mobile body by the movement mechanism is generated on the basis of the external information received from outside in the mobile body. This makes it possible to easily create the route guidance information in the mobile body.

An information processor according to an embodiment of the present disclosure includes: a wireless communication unit that performs wireless communication with a mobile body including an imaging unit and a movement mechanism; a user interface unit; a storage unit; and an information generator that generates route guidance information for use in moving the mobile body by the movement mechanism on a basis of one or more pieces of information out of received information received from the mobile body by the wireless communication unit, input information inputted by a user in the user interface unit, and held information held in the storage unit.

A second information processing method according to an embodiment of the present disclosure includes: a first step of obtaining one or more pieces of information out of received information received from a mobile body including an imaging unit and a movement mechanism through wireless communication with the mobile body, input information inputted from a user in a user interface unit in an information processor, and held information held in a storage unit in the information processor; and a second step of generating route guidance information for use in moving the mobile body by the movement mechanism on a basis of the one or more pieces of information obtained in the first step.

A second information processing program according to an embodiment of the present disclosure causes, when executed by a computer in an information processor, the computer to implement: a first step of obtaining one or more pieces of information out of received information received from a mobile body including an imaging unit and a movement mechanism through wireless communication with the mobile body, input information inputted from a user in a user interface unit in the information processor, and held information held in a storage unit in the information processor; and a second step of generating route guidance information for use in moving the mobile body by the movement mechanism on a basis of the one or more pieces of information obtained in the first step.

In the information processor, the second information processing method, and the second information processing program according to the respective embodiments of the present disclosure, the route guidance information for use in moving the mobile body by the movement mechanism is generated on the basis of one or more pieces of information out of the received information received from the mobile body, the input information inputted by the user, and the held information held in the storage unit. This makes it possible to easily create the route guidance information in the information processor.

A mobile body system according to an embodiment of the present disclosure includes: a mobile body including an imaging unit, a first wireless communication unit, and a movement mechanism that moves itself; and an information processor including a second wireless communication unit, a user interface unit, and a storage unit, the second wireless communication unit that performs wireless communication with the mobile body. One or both of a first information generator in the mobile body and a second information generator in the information processor are provided. The first information generator generates first information as route guidance information for use in moving the mobile body by the movement mechanism on a basis of external information received from outside by the first wireless communication unit, and the second information generator generates second information as the route guidance information on a basis of one or more pieces of information out of received information received from the mobile body by the second wireless communication unit, input information inputted by a user in the user interface unit, and held information held in the storage unit.

In the mobile body system according to the embodiment of the present disclosure, one or both of the first information generator that generates the first information as the route guidance information in the mobile body and the second information generator that generates the second information as the route guidance information in the information processor are provided. This makes it possible to easily create the foregoing route guidance information in one or both of the mobile body and the information processor.

According to the mobile body, the first information processing method, and the first information processing program of the respective embodiments of the disclosure, the foregoing route guidance information is generated on the basis of the foregoing external information, which makes it possible to easily create the route guidance information in the mobile body. This makes it possible to improve convenience of the user.

According to the information processor, the second information processing method, and the second information processing program of the respective embodiments of the present disclosure, the foregoing route guidance information is generated on the basis of one or more pieces of information out of the foregoing received information, the foregoing input information, and the foregoing held information, which makes it possible to easily create the route guidance information in the information processor. This makes it possible to improve convenience of the user.

According to the mobile body system of the embodiment of the present disclosure, one or both of the foregoing first information generator and the foregoing second information generator are provided, which makes it possible to easily create the foregoing route guidance information in one or both of the mobile body and the information processor. This makes it possible to improve convenience of the user.

It is to be noted that effects are not necessarily limited to the effects described here, and may be one or more of effects described in the present disclosure.

BRIEF DESCRIPTION OF THE DRAWINGS

FIG. 1 is a schematic view of a schematic configuration example of a mobile body system according to an embodiment of the present disclosure.

FIG. 2A is a schematic view of another schematic configuration example of a mobile body applied to the mobile body system illustrated in FIG. 1.

FIG. 2B is a schematic view of another schematic configuration example of the mobile body applied to the mobile body system illustrated in FIG. 1.

FIG. 2C is a schematic view of another schematic configuration example of the mobile body applied to the mobile body system illustrated in FIG. 1.

FIG. 3 is a block diagram illustrating a specific configuration example of the mobile body system illustrated in FIG. 1.

FIG. 4 is a flow chart illustrating an operation example in a case where route guidance information is generated in the mobile body illustrated in FIG. 3.

FIG. 5 is a flow chart illustrating an operation example in a case where route guidance information is generated in an operation device illustrated in FIG. 3.

FIG. 6 is a diagram illustrating an example of a correspondence relationship between kinds of move modes and various kinds of information to be applied.

FIG. 7 is a schematic view of an example of a route plan corresponding to generated route guidance information.

FIG. 8 is a schematic view of an example of an operation in a case of "Mode 1" illustrated in FIG. 6.

FIG. 9 is a schematic view of another example of the operation in the case of "Mode 1" illustrated in FIG. 6.

FIG. 10 is a schematic view of an application example in a case of "Mode 2" illustrated in FIG. 6.

FIG. 11 is a schematic view of an example of schedule information to be applied in a case of "Mode 3" illustrated in FIG. 6.

FIG. 12 is a schematic view of an example of an operation in a case of "Mode 4" illustrated in FIG. 6.

FIG. 13 is a schematic view of an example of an operation in a case of "Mode 6" illustrated in FIG. 6.

FIG. 14 is a schematic view of an example of an operation in a case of another move mode.

FIG. 15 is a schematic view of another example of an operation in a case of another move mode.

FIG. 16 is a block diagram illustrating a configuration example of a mobile body system according to a modification example 1.

FIG. 17 is a schematic view of an example of a communication operation according to the modification example 1.

FIG. 18 is a schematic view of another example of the communication operation according to the modification example 1.

FIG. 19 is a block diagram illustrating a schematic configuration example of a mobile body system according to a modification example 2.

FIG. 20 is a block diagram illustrating a schematic configuration example of a mobile body system according to a modification example 3.

MODES FOR CARRYING OUT THE INVENTION

In the following, some embodiments of the present disclosure are described in detail with reference to the drawings. It is to be noted that description is given in the following order.

1. Embodiment (an Example in which an Information Generator is Provided in Each of a Mobile Body and an Information Processor)

2. Modification Examples

Modification Example 1 (an example in a case where a communication operation is performed between a plurality of mobile bodies)

Modification Example 2 (an example in which the information generator is provided only in the mobile body)

Modification Example 3 (an example in which the information generator is provided only in the information processor)

3. Other Modification Examples

1. Embodiment

Schematic Configuration Example

FIG. 1 schematically illustrates a schematic configuration example of a mobile body system (mobile body system 3) according to an embodiment of the present disclosure. The mobile body system 3 includes a mobile body 1 serving as a so-called "Telepresence Robot" and an operation device (information processor) 2 for this mobile body 1. The operation device 2 is operated by a user 9 of the mobile body system 3 (the mobile body 1). Moreover, the mobile body 1 and the operation device 2 each have a function of performing mutual communication (wireless communication C12 in this example), which allows for exchange (transmission and reception) of various kinds of information (data) between the mobile body 1 and the operation device 2.

It is to be noted that each of a first information processing method and a first information processing program according to embodiments of the present disclosure is embodied by the mobile body 1 according to the present embodiment. Moreover, each of a second information processing method and a second information processing program according to embodiments of the present disclosure is embodied by the operation device 2 according to the present embodiment. Hence, these methods and programs are also described below.

Mobile Body 1

The mobile body 1 is a robot that is allowed to move itself by a movement mechanism 10. The mobile body 1 includes, for example, the movement mechanism 10, a microphone 111, a display unit I12, an imaging unit 113, and a connection unit 19.

The movement mechanism 10 is, for example, a mechanism that moves the mobile body 1 itself, as indicated by a dashed arrow M1 in FIG. 1. In this example, the movement mechanism 10 includes two wheel mechanisms and a driving mechanism (such as a motor) that drives the wheel mechanisms. Accordingly, the mobile body 1 is movable forward and backward, for example (refer to the arrow M1).

Alternatively, for example, any of other configurations may be used as the movement mechanism 10 in the mobile body 1, as illustrated in each of FIGS. 2A, 2B, and 2C. It is to be noted that this also applies to various modification examples, etc. to be described later.

Specifically, in an example of the mobile body 1 illustrated in FIG. 2A, the movement mechanism 10A includes four wheel mechanisms and a driving mechanism that drives the wheel mechanisms. In other words, in the example in FIG. 2A, the mobile body 1 includes an automobile (a four-wheeled vehicle having an automatic operation function).

In one example of the mobile body 1 illustrated in FIG. 2B, a movement mechanism 10B includes a bipedal walking mechanism and a driving mechanism that drives the bipedal walking mechanism. In other words, in the example in FIG. 2B, the mobile body 1 includes a bipedal walking humanoid robot.

In another example of the mobile body 1 illustrated in FIG. 2C, a movement mechanism 10C includes a flying mechanism using four propellers and a driving mechanism for the propellers. In other words, in the example in FIG. 2C, the mobile body 1 includes an unmanned aerial vehicle.

It is to be noted that the mobile body 1 is not limited to the examples illustrated in FIGS. 2A, 2B, and 2C, and may include, for example, a two-wheeled vehicle, a three-wheeled vehicle, a quadrupedal walking animal-type robot, a flight vehicle using a jet engine, etc.

The microphone 111 illustrated in FIG. 1 is a member that converts sound into an electric signal, and in this example, the microphone 111 is disposed in a frame region of the display unit 122 to be described later. Any of various types of microphones may be used as such a microphone 111.

The display unit I12 is a member used to display various kinds of information, and is configured using a display by any of various kinds of systems (such as a liquid crystal display and an organic EL (Electro Luminescence) display). This display unit I12 is allowed to display, for example, a face of the user 9, etc., as illustrated in FIG. 1. Specifically, for example, sound inputted to the microphone 111 is checked against information held in an external server (for example, an external server 8 to be described later) to display an image (such as the face of the user 9) linked to a person (such as the user 9) who utters the sound.

It is to be noted that the display unit I12 may be provided with the following height adjustment function, for example. In other words, face recognition processing may be performed on the basis of image information taken by the imaging unit 113 to be described later to automatically adjust a height of the display unit I12 in accordance with a position (height) of a recognized face (for example, refer to a dashed arrow M2 in FIG. 1).

The imaging unit 113 is a member that performs an imaging operation to obtain captured image data Di to be described later. The imaging unit 113 is disposed in the frame region of the display unit I12 in this example. Such an imaging unit 113 is configured using, for example, a CCD (Charge Coupled Device) or CMOS (Complementary Metal Oxide Semiconductor) imaging element (image sensor), etc.

The connection unit 19 is a member that connects the movement mechanism 10 to the display unit I12, as illustrated in FIG. 1, and includes a stick-like member extending in a vertical direction.

Operation Device 2

The operation device 2 serves as an operation device (operation terminal) for the mobile body 1, as described above, and corresponds to a specific example of an "information processor" in the present disclosure. The operation device 2 is operated by, for example, the user 9, etc., at a residence 90. Such an operation device 2 includes, for example, a mobile device such as a smartphone, a mobile phone, and a dedicated terminal.

Block Configuration Example

Next, description is given of a specific configuration example of such a mobile body system 3 with reference to FIG. 3. FIG. 3 illustrates a block diagram of each of the mobile body 1 and the operation device 2 as the specific configuration example of the mobile body system 3.

Mobile Body 1

The mobile body 1 includes a storage unit 12, a wireless communication unit 13, a position detector 141, an anomaly detector 142, a battery 16, an information generator 17, and a controller 18, in addition to the movement mechanism 10, the microphone 111, the display unit I12, and the imaging unit 113 mentioned above in FIG. 1.

It is to be noted that each of the electrical signal obtained by the microphone 111 and the captured image data Di obtained by the imaging unit 113 is inputted to the controller 18 to be described later, as illustrated in FIG. 3. Moreover, display image data to be used in the display unit I12 is supplied from the controller 18 to the display unit I12.

The storage unit 12 is a portion that stores (holds) various kinds of data, and input-output processing of these data is performed between the storage unit 12 and the controller 18 on an as-needed basis. Such a storage unit 12 includes, for example, any of various kinds of recording media including a magnetic recording medium, an optical storage medium, and semiconductor memories such as a ROM (Read Only Memory) and a RAM (Random Access Memory).

The wireless communication unit 13 has a function of performing wireless communication C12 with a wireless communication unit 23 to be described later in the operation device 2, as illustrated in FIG. 3. This makes it possible to perform wireless communication (wireless transmission and reception) of various kinds of information (for example, external information I12 and I21 to be described later, etc.) between the mobile body 1 and the operation device 2. This wireless communication unit 13 also has, for example, a function of performing wireless communication C18 with an external device (an external server 8 in this example) other than the operation device 2, as illustrated in FIG. 3. In other words, external information I81 to be described later, etc. may be supplied from the external server 8 to the wireless communication unit 13 through the wireless communication C18. It is to be noted that the wireless communication unit 13 corresponds to a specific example of a "first wireless communication unit" in the present disclosure.

Herein, examples of such wireless communications C12 and C18 include communication systems such as wireless LAN (Local Area Network), Bluetooth (registered trademark), TransferJet (registered trademark), and NFC (Near Field Communication). Note that the wireless communications C12 and C18 may be performed with use of any other communication system without limiting to these communication systems.

The position detector 141 is a portion that detects whether the mobile body 1 is located in an area (for example, a wireless communication area 93 to be described later) where the wireless communication C12, the wireless communication C18, etc. are executable, as described in detail later. It is to be noted that such position detection is performed with use of, for example, a GPS (Global Positioning System) function.

The anomaly detector 142 is a portion that compares a same point between the captured image data Di obtained at a present time by the imaging unit 113 and the captured image data Di obtained at a past time by the imaging unit 113 to detect a predetermined anomaly (presence or absence of an anomaly state) to be described later, as described in detail later.

The battery 16 serves as a power source of the mobile body 1 (supplies electric power Pb to each block in the mobile body 1), and includes any of various system cells. In this example, a solar cell 160 that generates electric power with use of sunlight Ls is used as a cell included in the battery 16, as illustrated in FIG. 3. Note that the battery 16 may be configured using any other kind of cell (such as a primary cell and a secondary cell) without limiting to the foregoing cell. Specifically, for example, a lithium-ion cell, a fuel cell, etc. may be used.

The information generator 17 is a portion that generates route guidance information Ir1 for use in moving the mobile body 1 by the movement mechanism 10, on the basis of external information received from outside (such as the operation device 2 or the external server 8) by the wireless communication unit 13, as described in detail later. Examples of the external information include inherent information (the external information I21) held in the operation device 2 and information (the external information I81) held in the external server 8. Moreover, examples of the inherent information (the external information I21) in the operation device 2 include information (GPS information) regarding a GPS in the operation device 2, search history information in the operation device 2, etc., as described in detail later. However, the inherent information is not limited thereto, and may include other kinds of information to be described later. It is to be noted that an operation of generating the route guidance information Ir1 in the information generator 17 is described in detail later.

Herein, the information generator 17 corresponds to a specific example of a "first information generator" in the present disclosure. Moreover, the route guidance information Ir1 corresponds to a specific example of "first information" in the present disclosure.

The controller 18 performs various kinds of control, processing, etc. in the mobile body 1. Specifically, the controller 18 performs control, etc. of operations in respective blocks (such as the movement mechanism 10, the microphone 111, the display unit I12, the imaging unit 113, the storage unit 12, the wireless communication unit 13, the position detector 141, the anomaly detector 142, the battery 16, and the information generator 17) in the mobile body 1, as illustrated in FIG. 3. To give an example, the controller 18 has a function of performing control of an operation of moving the mobile body 1 by the movement mechanism 10 on the basis of a control signal CTL. Such a controller 18 includes, for example, a microcomputer or the like using a CPU (Central Processing Unit), a ROM, a RAM, etc. It is to be noted that a control operation, etc. in the controller 18 is described in detail later.

Herein, the controller 18 corresponds to a specific example of a "movement controller" in the present disclosure. Moreover, the controller 18 and the information generator 17 correspond to specific examples of a "computer in a mobile body" in the present disclosure.

Operation Device 2

The operation device 2 includes a user interface unit (information input-output unit) 21, a storage unit 22, the wireless communication unit 23, an information generator 27, and a controller 28, as illustrated in FIG. 3.

The user interface unit 21 includes an information input unit 211 and a display unit 212 in this example. Note that, the user interface unit 21 may be configured using any other member in addition to (or in place of) the information input unit 211 and the display unit 212.

The information input unit 211 is a portion that receives various kinds of information (input information Ii) (a portion used to obtain the input information Ii) in accordance with an operation by the user 9. Such an information input unit 211 is configured using, for example, a predetermined keyboard, a predetermined button, a predetermined touch panel, etc.

The display unit 212 is a member used to display various kinds of information, and is configured using a display by any of various kinds of systems. Specifically, for example, the route guidance information Ir1 generated in the foregoing information generator 17, route guidance information Ir2 generated in the information generator 27 to be described later, etc. are displayed on this display unit 212, as illustrated in FIG. 3.

The storage unit 22 is a portion that stores (holds) various kinds of data, and performs input-output processing of these data (for example, held information Ih to be described later) with the controller 28 on an as-needed basis. Such a storage unit 22 includes any of various kinds of recording media, as with the foregoing storage unit 12.

The wireless communication unit 23 has a function of performing the wireless communication C12 with the foregoing wireless communication unit 13 in the mobile body 1, as illustrated in FIG. 3. This makes it possible for the wireless communication unit 23 to receive the external information I12 from the mobile body 1 and transmit the external information I21 to the mobile body 1, as described above. It is to be noted that the wireless communication unit 23 corresponds to a specific example of a "second wireless communication unit" in the present disclosure.

The information generator 27 is a portion that generates the route guidance information Ir2 for use in moving the mobile body 1 by the movement mechanism 10, on the basis of various kinds of information, as be described in detail later. Examples of the various kinds of information include one or more pieces of information out of received information (the external information I12) received from the mobile body 1 by the wireless communication unit 23, input information Ii inputted from the user 9 in the user interface unit 21 (the information input unit 211), and the held information Ih held in the storage unit 22, as illustrated in FIG. 3. Moreover, in this example, the route guidance information Ir2 is generated on the basis of the external information I12, the input information Ii, and the held information Ih.

Herein, examples of the external information I21 include movement history information in the mobile body 1, as described in detail later. Examples of the input information Ii include search history information (history information of information search executed by an operation by the user 9) in the operation device 2, as described later. Examples of the held information Ih include information (GPS information) regarding the GPS in the operation device 2, as described later. However, the route guidance information Ir2 may be generated with use of any other kind of information to be described later without limiting to these kinds of information. It is to be noted that an operation of generating the route guidance information Ir2 in the information generator 27 is described in detail later.

Such an information generator 27 corresponds to a specific example of a "second information generator" in the present disclosure. Moreover, the route guidance information Ir2 corresponds to a specific example of "second information" in the present disclosure.

The controller 28 performs various kinds of control, processing, etc. in the operation device 2. Specifically, the controller 28 performs control, etc. of operations in respective blocks (such as the user interface unit 21, the storage unit 22, the wireless communication unit 23, and the information generator 27) in the operation device 2, as illustrated in FIG. 3. As with the foregoing controller 18, such a controller 28 includes, for example, a microcomputer or the like, as illustrated in FIG. 3. It is to be noted that a control operation, etc. in the controller 28 is described in detail later.

Herein, the controller 28 and the information generator 27 correspond to specific examples of a "computer in an information processor" in the present disclosure.

Operation, Workings, and Effects

A. Basic Operation

In the mobile body system 3, for example, the user 9 performs a remote operation (an operation using the wireless communication C12) on the mobile body 1 present in a remote site with use of the operation device 2 to provide a situation that the user 9 is virtually present at the remote site, as illustrated in FIGS. 1 and 3. Specifically, for example, while the face, etc. of the user 9 is displayed on the display unit I12 of the mobile body 1, the mobile body 1 performs a movement operation in accordance with a predetermined route (refer to the dashed allow M1 in FIG. 1). This route is set (selected and determined) by the user 9 on the basis of the route guidance information generated by a technique described below.

B. Outline of Operation of Generating Route Guidance Information

Next, description is given of an outline of an operation of generating route guidance information (the route guidance information Ir1 and Ir2) in the mobile body system 3 with reference of FIG. 4, FIG. 5, etc. Specifically, a case of generation in the mobile body 1 (FIG. 4) and a case of generation in the operation device 2 (FIG. 5) are separately described in this order.

B-1. Case of Generation in Mobile Body 1

FIG. 4 illustrates a flow chart of an operation example in the mobile body 1 and the operation device 2 in time sequence in a case where the route guidance information Ir1 is generated in the mobile body 1 (the information generator 17). It is to be noted that reference numerals attached beside some of steps in FIG. 4 each indicate a block (refer to FIG. 3) that mainly performs a processing operation in the step in the mobile body 1 or the operation device 2.

In this operation example, first, predetermined software (application software) is downloaded in each of the operation device 2 and the mobile body 1, and thereafter, the user 9 performs a predetermined log-in operation (step S101 in FIG. 4). Specifically, the user 9 performs a predetermined operation on the operation device 2 (for example, inputting of information such as a user name and a password in the information input unit 211) to perform such a log-in operation on the mobile body 1 from the operation device 2 with use of the wireless communication C12. This makes it possible to execute a remote operation on the mobile body 1 with use of the operation device 2.

Next, a response signal with respect to such a log-in operation is transmitted from the mobile body 1 to the operation device 2 with use of the wireless communication C12 (step S102).

Subsequently, for example, the user interface unit 21 (the information input unit 211 and the display unit 212) in the operation device 2 is used to set (select and determine) a move mode Mm (a mode used in a case where the mobile body 1 performs a movement operation) to be described later by the user 9 (step S103). Thereafter, mode setting information Im to be described later is transmitted from the operation device 2 to the mobile body 1 with use of the wireless communication C12 (step S104). This mode setting information Im is information indicating the set move mode Mm, as described in detail later.

Next, the information generator 17 in the mobile body 1 obtains external information (various kinds of information to be described later) from outside of the mobile body 1 (step S105), as described in detail later. Specifically, in this example, the mobile body 1 receives the external information I21, the external information I81, etc. from the operation device 2, the external server 8, etc. with use of the wireless communication C12 and C18, etc. to obtain such external information. Thereafter, the information generator 17 generates the foregoing route guidance information Ir1 on the basis of the obtained (received) external information (step S106).

Thereafter, the thus-generated route guidance information Ir1 is transmitted from the mobile body 1 to the operation device 2 with use of the wireless communication C12 (step S107).

Subsequently, for example, the display unit 212 in the operation device 2 displays one or a plurality of route plans (two routes R1 and R2 in this example) for an actual movement operation in the mobile body 1 on the basis of the received route guidance information Ir1 (step S108), as illustrated in FIG. 7. It is to be noted that the route R1 in this example is a course from a start point Ps to an end point Pg1, and the route R2 is a course from the start point Ps to an end point Pg2 (refer to FIG. 7). Hence, the route guidance information Ir1 generated by the information generator 17 is provided to the user 9 through the wireless communication C12. It is to be noted that in this example, the routes R1 and R2 are displayed while being superimposed on map information Imap to be described later. This makes the respective routes R1 and R2 to be easily understood by the user 9 (this makes it possible to figure out the respective routes R1 and R2 at first glance).

Subsequently, for example, a route (an actual movement route in the mobile body 1) is determined (selected) by the user 9 with use of the user interface unit 21 (the information input unit 211 and the display unit 212) in the operation device 2 (step S109). Specifically, in a case of the example illustrated in FIG. 7, the user 9 selects one route from the foregoing routes R1 and R2 to determine the actual route. Thereafter, each of route information as the external information I21 and a movement instruction signal is transmitted from the operation device 2 to the mobile body 1 with use of the wireless communication C12 (step S110). This route information means information indicating the determined route. Moreover, the movement instruction signal means a signal used to provide an instruction for movement to the movement mechanism 10 (the controller 18) of the mobile body 1.

Thereafter, the mobile body 1 that has received the route information and the movement instruction signal starts its own movement operation on the basis of these pieces of information (step S111). Specifically, the movement mechanism 10 starts a movement operation in accordance with the control signal CTL supplied from the controller 18 to the movement mechanism 10. Accordingly, in the movement mechanism 10, the movement operation of the mobile body 1 is performed on the basis of the route determined by the user 9. Thus, the operations illustrated in FIG. 4 are completed.

As described above, in the mobile body 1 according to the present embodiment, the route guidance information Ir1 for use in moving the mobile body 1 by the movement mechanism 10 is generated on the basis of the external information (such as the external information I21 and the external information I81) received from outside. This makes it possible to easily create the route guidance information Ir1 in the mobile body 1, as described later.

It is to be noted that in the operation example illustrated in FIG. 4, operations from selection of the move mode Mm (step S103) to selection of the actual route (step S109) are performed after the log-in operation (step S101); however, respective operations may be performed in any other order without limiting to the foregoing order. Specifically, for example, operations from selection of the move mode Mm (step S103) to selection of the actual route (step S109) may be performed before the log-in operation (step S101).

B-2. Case of Generation in Operation Device 2

FIG. 5 illustrates a flow chart of an operation example in the mobile body 1 and the operation device 2 in time sequence in a case where the route guidance information Ir2 is generated in the operation device 2 (the information generator 27). It is to be noted that reference numerals attached beside some of steps in FIG. 5 each indicate a block (refer to FIG. 3) that mainly performs a processing operation in the step in the mobile body 1 or the operation device 2.

In this operation example, first, predetermined software is downloaded in each of the operation device 2 and the mobile body 1, and thereafter, the user 9 performs a predetermined log-in operation (step S201 in FIG. 5) similarly to the foregoing step S101. This makes it possible to execute a remote operation on the mobile body 1 with use of the operation device 2.

Next, as a response to such a log-in operation, position information Ip at a present time of the mobile body 1 is transmitted from the mobile body 1 to the operation device 2 with use of the wireless communication C12 (step S202). It is to be noted that such position information Ip of the mobile body 1 may be stored in, for example, the external server 8 on an as-needed basis, and the position information Ip may be transmitted from the external server 8 to the operation device 2 via the mobile body 1.

Subsequently, for example, the user interface unit 21 (the information input unit 211 and the display unit 212) in the operation device 2 is used to set (select and determine) the foregoing move mode Mm by the user 9 (step S203).

Next, the information generator 27 in the operation device 2 obtains the foregoing various kinds of information (for example, the external information I12, the input information Ii, the held information Ih, etc.) (step S204), as described in detail later. Thereafter, the information generator 27 generates the foregoing route guidance information Ir2 on the basis of the various kinds of information obtained (step S205).

Subsequently, the display unit 212 in the operation device 2 displays one or a plurality of route plans for an actual movement operation in the mobile body 1 on the basis of the generated route guidance information Ir2 (step S206) similarly to the foregoing step S108. Hence, the route guidance information Ir2 generated by the information generator 27 is provided to the user 9.

Next, for example, a route is determined (selected) by the user 9 with use of the user interface unit 21 (the information input unit 211 and the display unit 212) in the operation device 2 (step S207) similarly to the foregoing step S109. Thereafter, each of the foregoing route information as the external information I21 and the foregoing movement instruction signal is transmitted from the operation device 2 to the mobile body 1 with use of the wireless communication C12 (step S208).

Thereafter, the mobile body 1 that has received the route information and the movement instruction signal starts its own movement operation on the basis of these pieces of information (S209). Specifically, the movement mechanism 10 starts the movement operation in accordance with the control signal CTL supplied from the controller 18 to the movement mechanism 10. Accordingly, in the movement mechanism 10, the movement operation of the mobile body 1 is performed on the basis of the route determined by the user 9. Thus, the operations illustrated in FIG. 5 are completed.

As described above, in the operation device 2 according to the present embodiment, the route guidance information Ir2 for use in moving the mobile body 1 by the movement mechanism 10 is generated on the basis of one or more pieces of information out of the external information I21 received from the mobile body 1, the input information Ii inputted from the user 9, and the held information Ih held in the storage unit 22. This makes it possible to easily create the route guidance information Ir2 in the operation device 2, as described later.

C. Specific Operation in Each Move Mode

Next, description is given of a specific operation of the mobile body system 3 in each of move modes Mm with reference to FIGS. 8 to 15 in addition to FIGS. 6 and 7 mentioned above.

C-1. About Correspondence Relationship Between Move Modes Mm and Various Kinds of Information First, description is given of a correspondence relationship example between the move modes Mm (mode setting information Im) and various kinds of information (tag information) with reference to FIG. 6. FIG. 6 illustrates a summary of examples of correspondence relationships between kinds of the move modes Mm and various kinds of information to be applied in a correspondence table. A section indicated by "○" in FIG. 6 means a section where any of these correspondence relationships is present.

First, as the move mode Mm, a plurality of kinds of modes (six kinds, i.e., the following "Mode 1" to "Mode 6" in this example as illustrated in FIG. 6) are provided. Note that, for example, other kinds of move modes Mm to be described later may be provided in addition to (or in place of) the six kinds.

"Mode 1" . . . Move mode Mm used in a case where, in place of the user 9, the mobile body 1 strolls in any of various kinds of facilities (for example, a museum, a zoo, an aquarium, etc.)

Examples of Various Kinds of Information to be Applied: It1 to It3, It5 to It8, and It12

"Mode 2" . . . Move mode Mm used in a case where, in place of the user 9, the mobile body 1 strolls during a trip to any of various regions (domestic or foreign regions)

Examples of Various Kinds of Information to be Applied: It1 to It8, and It12

"Mode 3" . . . Move mode Mm used in a case where, in place of the user 9, the mobile body 1 attends a business meeting Examples of Various Kinds of Information to be Applied: It5, It7 to It10, and It12

"Mode 4" . . . Move mode Mm used in a case where, in place of the user 9, the mobile body 1 patrols in a building, etc. as a security guard Examples of Various Kinds of Information to be Applied: It5, It7, It8, and It12

"Mode 5" . . . Move mode Mm used in a case where, in place of the user 9, the mobile body 1 configured as a unmanned aerial vehicle (for example, refer to FIG. 2C mentioned above) takes an aerial tour Examples of Various Kinds of Information to be Applied: It1 to It7, and It12

"Mode 6" . . . Move mode Mm used in a case where the mobile body 1 monitors (follows) the user 9, etc. (the mobile body 1 serves as a monitoring robot)

Examples of Various Kinds of Information to be Applied: It3 to It5, It7, It8, It11, and It12

Moreover, in this example, as various kinds of information (tag information), mainly the following twelve kinds of information (It1 to It12) are used, as illustrated in FIG. 6. In other words, these various kinds of information are used for generation of the route guidance information Ir1 and Ir2 in accordance with the move mode Mm set by a user.

Information It1 regarding the GPS of the operation device 2 is position information, etc. of the operation device 2 obtained with use of the GPS function in the operation device 2. It is to be noted that the information It1 regarding the GPS of the operation device 2 may include movement history information (position information in time sequence) of the operation device 2.

The search history information It2 in the operation device 2 is information of a history of searches of various kinds of information conducted by the user (search history information of the user 9 using the Internet) with use of the user interface unit 21 in the operation device 2. In other words, the search history information It2 may be also regarded as information (preference information) that reflects preference, interests, etc. of the user 9.

Weather-related information It3 is information related to weather (information such as weather, temperature, humidity, an amount of sunlight, an amount of ultraviolet radiation, various kinds of advisories and warnings related to weather). It is to be noted that, for example, the weather-related information It3 of a region where the mobile body 1 is present at the point in time may be automatically obtained by a combination of the weather-related information It3 and the foregoing position information Ip of the mobile body 1.

Wide area map information It4 (Imap) is information indicating a wide area map. Examples of the wide area map information It4 may include information such as a road width, a gradient, a bending degree, and a congestion degree of each road (each route), information indicating presence or absence of a level difference in each route (information regarding a level-difference route) as illustrated in, for example, FIG. 7 mentioned above (reference numerals Pd1 and Pd2), and the like.

Remaining electric power information It5 of the mobile body 1 is information indicating a remaining amount of electric power Pb stored in the battery 16 of the mobile body 1, and, for example, an indication of the remaining amount of the electric power Pb is expressed in percentage (%), as described later in FIG. 15.

Evaluation information It6 by other users is information indicating various kinds of evaluation contents by other users, and is obtained from, for example, a previously informed inquiry destination, etc. via a cloud platform (such as the external server 8). Specifically, in a case of the foregoing "Mode 1", for example, the evaluation information It6 may include evaluation on actually used movement routes in various kinds of facilities (such as a museum) by other users (such as whether the movement routes are satisfactory). In such a case, it is possible to use (reflect) the evaluation information It6 for generation of route suggestion information in a case where another user who subsequently logs in uses the mobile body system 3.

Time information It7 is information indicating a time at the point (a present time). It is to be noted that, for example, in a case where the mobile body 1 is abroad (in a foreign country), the time information It7 in a region where the mobile body 1 is present at the point in time may be automatically obtained by a combination of the time information It7 and the foregoing position information Ip of the mobile body 1. Moreover, various kinds of time information regarding a location of the mobile body 1 (for example, time information regarding various kinds of facilities) may be also obtained.

In-building map information It8 (Imap) is information indicating a map inside any of various kinds of buildings such as various kinds of facilities mentioned above, offices, buildings to be guarded in the foregoing "Mode 4", and the like. Examples of the in-building map information It8 may include information such as a road width, a gradient, a bending degree, and a congestion degree, and presence or absence of a level difference in each route.

Schedule information It9 of the user 9 is information indicating a schedule (for example, a hourly task schedule in one day, etc.) of the user 9 (for example, refer to FIG. 11 to be described later).

Movement history information It10 of the mobile body 1 is information indicating a movement history of the mobile body 1, and is obtained with use of the GPS function in the mobile body 1.

Action history information It11 of the user 9 is information indicating an action history of the user 9, and is obtained with use of, for example, the captured image data Di obtained in the mobile body 1, the GPS function in the mobile body 1, etc., as described in detail later. It is to be noted that the action history information It11 of the user 9 may be regarded as information indicating an action tendency of the user 9 (predicting future action).

Wireless communication area information It12 is information indicating a range (region) of an area (a wireless communication area 93 to be described later) where the wireless communications C12 and C18, etc. used in the mobile body 1 are executable. It is to be noted that the wireless communication area information It12 in a region where the mobile body 1 is located at the point in time (a peripheral region of the position of the mobile body 1) may be automatically obtained by a combination of the wireless communication area information It12 and the foregoing position information Ip of the mobile body 1.

Herein, examples of the foregoing external information I21 (or the external information I81) include the following information out of these various kinds of information (It1 to It12). The examples include the information It1 regarding the GPS of the operation device 2, the search history information It2, the weather-related information It3, the wide area map information It4, the evaluation information It6 by the other users, the time information It7, the in-building map information It8, the schedule information It9, the wireless communication area information It12, etc. In other words, each of these kinds of information corresponds to a specific example of "external information" in the present disclosure. Moreover, the information It1 regarding the GPS of the operation device 2, the search history information It2, and the schedule information It9 out of these kinds of "external information" correspond to specific examples of "inherent information (held in an operation device)" in the present disclosure. It is to be noted that these kinds of "external information" are obtained in, for example, the mobile body 1, and thereafter are held in the storage unit 12 in the mobile body 1.

Moreover, examples of the foregoing input information Ii in the operation device 2 include the search history information It2 and the foregoing mode setting information Im. In other words, each of these kinds of information corresponds to a specific example of "input information" in the present disclosure. Examples of the foregoing held information Ih in the operation device 2 include the information It1 regarding the GPS of the operation device 2, the search history information It2, and the schedule information It9. In other words, each of these kinds of information corresponds to a specific example of "held information" in the present disclosure. Examples of the foregoing external information I12 (received information in operation device 2) include the remaining electric power information It5 of the mobile body 1, the movement history information It10 of the mobile body 1, the action history information It11 of the user 9, and the foregoing position information Ip of the mobile body 1. In other words, each of these kinds of information corresponds to a specific example of "received information" in the present disclosure. It is to be noted that each of the input information Ii, the held information Ih, and the external information I12 is obtained in the operation device 2, and thereafter is held in the storage unit 22 in the operation device 2.

C-2. Details of Each Move Mode Mm

Next, description is given of details of each of the move modes Mm ("Mode 1" to "Mode 6") on the basis of such a correspondence relationship example between the move modes Mm and various kinds of information with reference to FIGS. 6 to 15.

Operation in "Mode 1"

This "Mode 1" is the move mode Mm used in a case where, in place of the user 9, the mobile body 1 strolls in any of various kinds of facilities.

Specifically, for example, the route guidance information Ir1 or Ir2 is generated in the following manner in consideration of, for example, a case where a certain user 9 performs a log-in operation on the mobile body 1 mounted in an aquarium with use of the operation device 2 through the wireless communication C12. It is to be noted that in this case, for example, the user 9 receives a log-in ID (identification) and a password of the mobile body 1 mounted in the aquarium by e-mail, etc. on the basis of information of member registration previously conducted by the user 9.

In this case, the user 9 first selects and determines the "Mode 1" from a plurality of kinds of move modes Mm with use of the operation device 2 as described above with reference to FIGS. 4 and 5. It is to be noted that the "Mode 1" may be automatically selected with use of the position information Ip (such as being present in the aquarium) of the mobile body 1, etc.

Thereafter, the information generator 17 in the mobile body 1 or the information generator 27 in the operation device 2 generates the route guidance information Ir1 or the route guidance information Ir2 on the basis of the foregoing examples of various kinds of information (It1 to It3, It5 to It8, and It12) applied to the "Mode 1". In other words, in the "Mode 1", the route guidance information Ir1 or Ir2 is automatically generated with use of, for example, the following tag information.

Information It1 regarding the GPS of the operation device 2

Search history information It2 in the operation device 2

Weather-related information It3

Remaining electric power information It5 of the mobile body 1

Evaluation information It6 by other users

Time information It7

In-building map information It8

Wireless communication area information It12

Specifically, the route guidance information Ir1 or Ir2 is automatically generated in consideration of, for example, preference information of the user 9 obtained by the search history information It2, information regarding weather, temperature, etc. in a region around the aquarium obtained by the weather-related information It3, magnitude of the electric power Pb obtained by the remaining electric power information It5, evaluation by other users on respective spots in the aquarium obtained by the evaluation information It6, a closing time of the aquarium, a starting time of each event in the aquarium, etc. obtained on the basis of the time information It7, and the like.

Thereafter, for example, the display unit 212 of the operation device 2 displays route plans (two routes R1 and R2 in this example) on the basis of the generated route guidance information Ir1 or Ir2, and the in-building map information It8 (map information Imap in the aquarium in this example), as illustrated in FIG. 7. Thereafter, the user 9 selects and determines one plan from the route plans with use of the operation device 2, as described above in FIGS. 4 and 5. Thus, a movement operation of the mobile body 1 starts in accordance with the determined route (movement route).

Herein, upon generation of the foregoing route guidance information Ir1 or Ir2, the information generator 17 or the information generator 27 desirably generates the route guidance information Ir1 or IR2 with consideration also given to the following points.

Specifically, for example, in a case where the mobile body 1 includes movement mechanisms 10, 10A, 10B, etc. including a wheel mechanism (refer to FIGS. 1 and 2A) and a walking mechanism (refer to FIG. 2B), the information generator 17 or 27 desirably generates the route guidance information Ir1 or Ir2 while avoiding a route having a level difference (a level difference route). Specifically, in an example illustrated in FIG. 7, the route R2 that is one of the routes R1 and R2 is generated with use of the in-building map information It8 (Imap) so as to avoid, for example, level difference regions indicated by reference numerals Pd1 and Pd2. Moreover, the information generators 17 or 27 desirably generates the route guidance information Ir1 or IR2 with consideration also given to gradient magnitude, a road width, etc. in each route. The reason for this is that in a case of the mobile body 1 including any of such movement mechanisms 10, 10A, 10B, etc., also considering these kinds of information makes it possible to further improve convenience of the user 9, unlike a case of the mobile body 1 including the movement mechanism 10C (refer to FIG. 2C) including a flying mechanism. In other words, this makes an actual movement operation of the mobile body 1 smooth, and prevents a malfunction caused by a fall, etc. of the mobile body 1.

Moreover, for example, in a case where the solar cell 160 is used as a power source of the mobile body 1 as illustrated in FIG. 8 (refer to FIG. 3), the controller 18 in the mobile body 1 desirably controls an operation of the movement mechanism 10 as follows. That is, the controller 18 controls the movement mechanism 10 with use of the position information Ip of the mobile body 1, the weather-related information It3, the time information It7, etc. mentioned above so as to cause the mobile body 1 to preferentially perform a movement operation outdoors (outside a building 91) during daylight hours when sunlight from the sun 92 is obtained. In such a case, it is possible to efficiently store electric power with use of the solar cell 160 in the movement operation during daylight hours, thereby suppressing shortage of the remaining amount of the electric power Pb in the mobile body 1.

Further, as illustrated in FIG. 9, for example, in a case where the foregoing position detector 141 detects that the mobile body 1 is not located in the wireless communication area 93 (has moved outside of the wireless communication area 93) (refer to an arrow M1 in FIG. 9), the controller 18 desirably controls the operation of the movement mechanism 10 as follows. That is, the controller 18 controls the movement mechanism 10 so as to cause the mobile body 1 to move to inside of the wireless communication area 93. Specifically, for example, in a case where the movement mechanism 10 is of a backwardly runnable (backwardly moveable) type, for example, the movement mechanism 10 is controlled so as to cause the mobile body 1 to start moving backward into the wireless communication area 93, as indicated by an arrow M11 in FIG. 9. Moreover, for example, in a case where the movement mechanism 10 is of a type in which such backward movement is not possible, for example, the movement mechanism 10 is controlled so as to cause the mobile body 1 to start U-turn movement into the wireless communication area 93, as indicated by an arrow M12 in FIG. 9. In such cases, it is possible for the mobile body 1 itself to automatically avoid a situation that the wireless communications C12, C18, etc. with the mobile body 1 are not executable to make the mobile body 1 inoperable, which makes it possible to further improve convenience of the user 9.

It is to be noted that in a case where after that, the mobile body 1 returns to inside of the wireless communication area 93, for example, the route guidance information Ir1 or Ir2 may be automatically regenerated to be provided to the user 9 again. Moreover, in a case where the mobile body 1 is about to move to outside of the wireless communication area 93, the controller 18 may control the movement mechanism 10 so as to cause the mobile body 1 to automatically stop its movement and so as to provide notification of such movement stop to the operation device 2 (the user 9). In such a case, it is possible to prevent the mobile body 1 from moving to outside of the wireless communication area 93.

As described above, in this "Mode 1", only performing an operation (an operation of determining the move mode Mm and the movement route) on the operation device 2 in hand makes it possible for the user 9 to virtually stroll in any of various facilities with use of the mobile body 1 while staying at his residence 90 as illustrated in FIG. 1. In other words, the user 9 does not need time, transportation fees, etc. that are necessary to actually travel to various facilities, and does not need to actually walk around in various facilities, which makes it possible to enjoy strolling as if actually being in the facilities without effort, fatigue, trouble, etc. It is to be noted that in a case where the mobile body 1 moves in any of such various facilities, data of audio information regarding respective spots and respective events may be transmitted to the operation device 2 through, for example, the wireless communications C18 and C12, etc., and may be outputted to the user with use of a speaker, etc., in the operation device 2. This enhances realism as if the user 9 is actually being in the facilities, which makes it possible to further improve convenience.

Operation in "Mode 2"

This "Mode 2" is the move mode Mm used in a case where, in place of the user 9, the mobile body 1 strolls during a trip to any of various regions (domestic or foreign regions).

Specifically, for example, the route guidance information Ir2 or Ir2 is generated in the following manner in consideration of, for example, a case where a certain user 9 performs a log-in operation on the mobile body 1 mounted in a given region (domestic or foreign tourist spot) with use of the operation device 2 through the wireless communication C12. It is to be noted that, for example, the log-in operation herein is available on a membership registration basis or a chargeable basis.

Even in this case, the user 9 first selects and determines the "Mode 2" from a plurality of kinds of move modes Mm with use of the operation device 2, as described above in FIGS. 4 and 5. It is to be noted that the "Mode 2" may be automatically selected with use of the position information Ip of the mobile body 1, etc.

Thereafter, the information generator 17 in the mobile body 1 or the information generator 27 in the operation device 2 generates the route guidance information Ir1 or the route guidance information Ir2 on the basis of the foregoing examples of various kinds of information (It1 to It8, and It12) applied to the "Mode 2". In other words, in the "Mode 2", the route guidance information Ir1 or Ir2 is automatically generated with use of, for example, the following tag information.

Information It1 regarding the GPS of the operation device 2

Search history information It2 in the operation device 2

Weather-related information It3 wide area map information It4

Remaining electric power information It5 of the mobile body 1

Evaluation information It6 by other users

Time information It7

In-building map information It8

Wireless communication area information It12

Specifically, the route guidance information Ir1 or Ir2 is automatically generated in consideration of, for example, preference information of the user 9 obtained by the search history information It2, information regarding weather, temperature, etc. in a corresponding region obtained by the weather-related information It3, magnitude of the electric power Pb obtained by the remaining electric power information It5, evaluation by other users on respective spots in the region obtained by the evaluation information It6, a closing time of each of the spots, a starting time of each event in the region etc. obtained on the basis of the time information It7, and the like. Moreover, in this "Mode 2", information about whether the user 9 himself has actually been to a specific region obtained by the information It1 regarding the GPS of the operation device 2, the search history information It2, etc. is reference information useful to automatically generate the route guidance information Ir1 or Ir2.

It is to be noted that, thereafter, the display unit 212 of the operation device 2 displays route plans on the basis of the generated route guidance information Ir1 or Ir2, and the wide area map information It4 or the in-building map information It8 in a manner similar to the foregoing case of the "Mode 1". Thereafter, the user 9 selects and determines one plan from the route plans with use of the operation device 2, as described above in FIGS. 4 and 5. Thus, a movement operation of the mobile body 1 starts in accordance with the determined route (movement route).

Herein, for example, in this "Mode 2", using a head mount display 4 in combination makes it possible for the user 9 to enjoy a virtual trip with enhanced realism, as illustrated in FIG. 10. The head mount display 4 includes a display unit 41 having a shape corresponding to a portion of right and left eyes of the user 9 and an ear-mounted portion having a shape corresponding to a portion of right and left ears of the user 9. Further, for example, it is possible to view, on the display unit 41, captured images in various regions obtained by the mobile body 1 on the basis of the captured image data Di transmitted from the mobile body 1 to the head mount display 4, and the like via the operation device 2, as illustrated in FIG. 10. In this case, in terms of enhancement of realism, the captured images are desirably three-dimensional images (3D images). Moreover, stereo audio data, etc. obtained by the microphone 111 of the mobile body 1 may be supplied to a speaker, etc. of the head mount display 4 via the operation device 2. It is to be noted that the user 9 may use a fee payment function (such as a payment function using various kinds of electronic money) to pay a fee for such a virtual trip experiment service using the head mount display 4. However, in consideration of a possibility of theft of the mobile body 1 itself, it is desirable to make fee payment using such electronic money in the following manner. That is, for example, it may be said that the user 9 desirably enters an identification number on the operation device 2 in advance or a process of verifying the user 9 is desirably performed with use of card authentication, biometric authentication, etc.

As described above, in this "Mode 2", only performing an operation (an operation of determining the move mode Mm and the movement route) on the operation device 2 in hand makes it possible for the user 9 to virtually stroll (travel) in any of various domestic or foreign tourist spots with use of the mobile body 1 while staying at his residence 90. In other words, the user 9 does not need time, transportation fees, etc. necessary to actually go to any of various tourist spots, and does not need to actually walk around in various tourist spots, which makes it possible to enjoy sightseeing as if actually being in the tourist sites without effort, fatigue, trouble, etc.

Operation in "Mode 3"

This "Mode 3" is the move mode Mm used in a case where, in place of the user 9, the mobile body 1 attends a business meeting, a described above.

Specifically, for example, a case where the user 9 located in a remote site (for example, a branch office, a business office, etc. separated by a distance or the residence 90 of the user 9, etc.) performs a log-in operation on the mobile body 1 mounted in a company (for example, a headquarter, etc.) where the user 9 works for with use of the operation device 2 through the wireless communication C12 is considered. In this case, for example, the route guidance information Ir1 or Ir2 is generated in the following manner It is to be noted that, for example, the log-in operation herein is available on a membership registration basis or a chargeable basis.

Even in this case, the user 9 first selects and determines the "Mode 3" from a plurality of kinds of move modes Mm with use of the operation device 2, as described above in FIGS. 4 and 5. It is to be noted that the "Mode 3" may be automatically selected with use of the position information Ip of the mobile body 1, etc.

Thereafter, the information generator 17 in the mobile body 1 or the information generator 27 in the operation device 2 generates the route guidance information Ir1 or the route guidance information Ir2 on the basis of the foregoing examples of various kinds of information (It5, It7 to It10, and It12) applied to the "Mode 3". In other words, in the "Mode 3", the route guidance information Ir1 or Ir2 is automatically generated with use of, for example, the following tag information.

Remaining electric power information It5 of the mobile body 1

Time information It7

In-building map information It8

Schedule information It9 of the user 9 (for example, refer to FIG. 11)

Movement history information It10 of the mobile body 1

Wireless communication area information It12

Specifically, the route guidance information Ir1 or Ir2 is automatically generated in consideration of, for example, magnitude of electric power Pb obtained by the remaining electric power information It5, information regarding a present time obtained by the time information It7, a business schedule for the day of the user 9 (for example, time and place of a meeting to be attended, etc.) obtained by the schedule information It9, and the like. In other words, the controller 18 in the mobile body 1 controls the movement mechanism 10 so as to cause the mobile body 1 to automatically move in accordance with, for example, the preset schedule information It9 of the user 9.

Moreover, in this "Mode 3", information about a place of a meeting room to which the mobile body 1 has been in the past obtained by the movement history information It10 of the mobile body 1 is reference information that is useful to automatically generate the route guidance information Ir1 or Ir2. The reason for this is that in general, a place (such as a meeting room) where a meeting is held in a company is limited to some extent, and there is a tendency that the place is set while corresponding to a business schedule, etc.

It is to be noted that, thereafter, the display unit 212 of the operation device 2 displays route plans on the basis of the generated route guidance information Ir1 or Ir2, and the in-building map information It8 in a manner similar to the foregoing case of the "Mode 1". Thereafter, the user 9 selects and determines one plan from the route plans with use of the operation device 2, as described above in FIGS. 4 and 5. Thus, a movement operation of the mobile body 1 starts in accordance with the determined route (movement route).

As described above, in this "Mode 3", only performing an operation (an operation of determining the move mode Mm and the movement route) on the operation device 2 in hand makes it possible for the user 9 to virtually attend a business meeting with use of the mobile body 1 while staying at a remote site (for example, a branch office, a business office, etc. or his residence 90, etc.). In other words, it is possible for the user 9 to conduct a business operation in the meeting without needing time, transportation fees, etc. necessary to actually go to a meeting room.

Moreover, the route guidance information Ir1 or Ir2 is automatically generated with use of, for example, useful information such as the schedule information It9 of the user 9, and the movement history information It10 of the mobile body 1, which achieves the following effect, for example. That is, for example, it is possible to easily obtain suitable route guidance information Ir1 or Ir2 without selecting whether or not to use complicated tag information, etc., thereby significantly improving convenience of the user 9.

Operation in "Mode 4"

This "Mode 4" is the move mode Mm used in a case where, in place of the user 9, the mobile body 1 patrols in a building, etc. as a security guard. In other words, in the "Mode 4", the mobile body 1 serves as a security guard robot.

Specifically, for example, a case where the user 9 located in a remote site (for example, in a security company or a security guard room where the user 9 works, or the residence 90 of the user 9, etc.) performs a log-in operation on the mobile body 1 mounted in a building to be guarded with use of the operation device 2 through the wireless communication C12 is considered. In this case, for example, the route guidance information Ir2 or Ir2 is generated in the following manner. It is to be noted that, for example, the log-in operation herein is available on a membership registration basis or a chargeable basis.

Even in this case, as described above in FIGS. 4 and 5, the user 9 first selects and determines the "Mode 4" from a plurality of kinds of move modes with use of the operation device 2. It is to be noted that the "Mode 4" may be automatically selected with use of the position information Ip of the mobile body 1, etc.

Thereafter, the information generator 17 in the mobile body 1 or the information generator 27 in the operation device 2 generates the route guidance information Ir1 or the route guidance information Ir2 on the basis of the foregoing examples of various kinds of information (It5, It7, It8, and It12) applied to the "Mode 4". In other words, in the "Mode 4", the route guidance information Ir1 or Ir2 is automatically generated with use of, for example, the following tag information.

Remaining electric power information It5 of the mobile body 1

Time information It7

In-building map information It8

Wireless communication area information It12

Specifically, the route guidance information Ir1 or Ir2 is automatically generated in consideration of, for example, magnitude of the electric power Pb obtained by the remaining electric power information It5, information regarding a present time obtained by the time information It7, and the like.

It is to be noted that, thereafter, the display unit 212 of the operation device 2 displays route plans on the basis of the generated route guidance information Ir1 or Ir2, and the in-building map information It8 in a manner similar to the foregoing case of the "Mode 1". Thereafter, the user 9 selects and determines one plan from the route plans with use of the operation device 2, as described above in FIGS. 4 and 5. Thus, a movement operation of the mobile body 1 starts in accordance with the determined route (movement route).

On this occasion, for example, as illustrated in FIG. 12, the foregoing anomaly detector 142 in the mobile body 1 may detect an anomaly (presence or absence of an anomaly state) in a building under security in the following manner, for example. In other words, the anomaly detector 142 may compare a same point between captured image data Di(n) at the point in time (a present time) obtained by the imaging unit 113 and captured image data Di(p) at a past time obtained by the imaging unit 113 to detect such an anomaly. In other words, for example, in this example in FIG. 12, as indicated by Da, an object that is not present in the captured image data Di(p) at the past time exists in the captured image data Di(n) at the present time, which causes the anomaly detector 142 to detect (determine) that the anomaly state occurs. It is to be noted that such a detection result is informed to the user 9, etc. with use of the external information I12, etc. transmitted through the wireless communication C12.

As described above, in this "Mode 4", only performing an operation (an operation of determining the move mode Mm and the movement route) on the operation device in hand makes it possible for the user 9 to patrol (keep guard) in a building to be guarded with use of the mobile body 1 while staying at a remote site (for example, in a security company or a security guard room, or the residence 90, etc.). In other words, the user 9 does not need time, transportation fees, etc. necessary to actually go to the building to be guarded, or does not need to actually walk around in the building, which makes it possible for the user 9 to conduct a patrolling operation as if actually being in the site without effort, fatigue, trouble, etc.

Operation in "Mode 5"

This "Mode 5" is the move mode Mm used in a case where, in place of the user 9, the mobile body 1 configured as a unmanned aerial vehicle (for example, refer to FIG. 2C mentioned above) takes an aerial tour. In other words, this "Mode 5" corresponds to an application in which the mobile body 1 as a unmanned aerial vehicle strolls in air in any of various kinds of facilities or during a trip in the "Mode 1" and the "Mode 2" mentioned above.

Specifically, for example, the route guidance information Ir1 or IR2 is generated in the following manner in consideration of, for example, a case where a certain user 9 performs a log-in operation on the mobile body 1 mounted in any of the various kinds of facilities and various kinds of regions mentioned above with use of the operation device 2 through the wireless communication C12. It is to be noted that, for example, the log-in operation herein is available on a membership registration basis or a chargeable basis.

Even in this case, the user 9 first selects and determines the "Mode 5" from a plurality of kinds of move modes Mm with use of the operation device 2, as described above in FIGS. 4 and 5. It is to be noted that the "Mode 5" may be automatically selected with use of the position information Ip of the mobile body 1, etc.

Thereafter, the information generator 17 in the mobile body 1 or the information generator 27 in the operation device 2 generates the route guidance information Ir1 or the route guidance information Ir2 on the basis of the foregoing examples of various kinds of information (It1 to It7, and It12) applied to the "Mode 5". In other words, in the "Mode 5", the route guidance information Ir1 or Ir2 is automatically generated with use of, for example, the following tag information.

Information It1 regarding the GPS of the operation device 2

Search history information It2 in the operation device 2

Weather-related information It3 wide area map information It4

Remaining electric power information It5 of the mobile body 1

Evaluation information It6 by other users

Time information It7

Wireless communication area information It12

Specifically, the route guidance information Ir1 or Ir2 is automatically generated in consideration of, for example, preference information of the user 9 obtained by the search history information It2, information regarding weather, temperature, etc. in a corresponding region obtained by the weather-related information It3, magnitude of the electric power Pb obtained by the remaining electric power information It5, evaluation by other users obtained by the evaluation information It6, various kinds of times obtained on the basis of the time information It7, and the like. Moreover, even in this "Mode 5", information about whether the user 9 himself has actually been to a specific facility or region obtained by the information It1 regarding the GPS of the operation device 2, the search history information It2, etc. is reference information useful to automatically generate the route guidance information Ir1 or Ir2.

It is to be noted that, thereafter, the display unit 212 of the operation device 2 displays route plans on the basis of the generated route guidance information Ir1 or Ir2, and the wide area map information It4 in a manner similar to the foregoing case of the "Mode 1". Thereafter, the user 9 selects and determines one plan from the route plans with use of the operation device 2, as described above in FIGS. 4 and 5. Thus, a movement operation of the mobile body 1 starts in accordance with the determined route (movement route).

It is to be noted that even in this "Mode 5", the user 9 may use the head mount display 4 in combination in a similar manner to the case of the foregoing "Mode 2" (refer to FIG. 10).

As described above, in this "Mode 5", only performing an operation (an operation of determining the move mode Mm and the movement route) on the operation device 2 in hand makes it possible for the user 9 to virtually take an aerial tour in any of various kinds of facilities and various kinds of regions with use of the mobile body 1 while staying at his residence 90. In other words, the user 9 does not need time, transportation fees, etc. necessary to actually go to any of various facilities and various regions, and does not need to actually walk around in any of various facilities and various regions, which makes it possible to enjoy an aerial tour as if actually being in the site without effort, fatigue, trouble, etc.

Moreover, for example, flying the mobile body 1 as the unmanned aerial vehicle during a work break allows the user 9 to make virtual experience as if the user 9 himself flies in the sky, which makes it possible for the user 9 to make a refreshing change.

Operation in "Mode 6"

This "Mode 6" is the move mode Mm used in a case where the mobile body 1 monitors (follows) the user 9, etc. In other words, in this "Mode 6", the mobile body 1 serves as an monitoring robot. It is to be noted that examples of a target to be monitored in this case include the user 9 himself, a family or a roommate of the user 9, etc., and specific examples thereof include an elderly person, a child, etc. A case where the target to be monitored is the user 9 himself is described below as an example.

Specifically, for example, a case where the user 9 performs a log-in operation on the mobile body 1 mounted in a building where a person to be monitored lives with use of the operation device 2 through the wireless communication C12 is considered. In this case, for example, the route guidance information Ir2 or Ir2 is generated in the following manner. It is to be noted that, for example, the log-in operation herein is available on a membership registration basis or a chargeable basis.

Even in this case, the user 9 first selects and determines the "Mode 6" from a plurality of kinds of move modes with use of the operation device 2, as described above in FIGS. 4 and 5. It is to be noted that the "Mode 6" may be automatically selected with use of the position information Ip of the mobile body 1, etc.

Thereafter, the information generator 17 in the mobile body 1 or the information generator 27 in the operation device 2 generates the route guidance information Ir1 or the route guidance information Ir2 on the basis of the foregoing examples of various kinds of information (It3 to It5, It7, It8, It11, and It12) applied to the "Mode 6". In other words, in the "Mode 6", the route guidance information Ir1 or Ir2 is automatically generated with use of, for example, the following tag information.

Weather-related information It3
Wide area map information It4
Remaining electric power information It5 of the mobile body 1
Time information It7
In-building map information It8
Action history information It11 of the user 9
Wireless communication area information It12

Specifically, the route guidance information Ir1 or Ir2 is automatically generated in consideration of, for example, information regarding weather, temperature, etc. in a corresponding region obtained by the weather-related information It3, magnitude of the electric power Pb obtained by the remaining electric power information It5, various kinds of times obtained on the basis of the time information It7, and the like.

Moreover, in this "Mode 6", action information regarding the user 9 obtained by the action history information of the user 9 is reference information useful to automatically generate the route guidance information Ir1 or Ir2.

Specifically, for example, as illustrated in FIG. 13, it is desirable for the information generators 17 or 27 to generate the route guidance information Ir1 or Ir2 with consideration also given to the action history information It11 regarding the user 9 obtained during a standby state of the mobile body 1 (while a movement operation is not executed). In other words, in this example, monitoring the action of the user 9 (refer to a route R3 in FIG. 13) in, for example, a building or a specific room by the imaging unit 113 of the mobile body 1 in the standby state allows the mobile body 1 to learn the action information regarding the user 9 and make action prediction. In such a case, it is possible to obtain reference information useful to automatically generate the route guidance information Ir1 or Ir2 while effectively using the standby state of the mobile body 1.

It is to be noted that, thereafter, the display unit 212 of the operation device 2 displays route plans on the basis of the generated route guidance information Ir1 or Ir2, and the wide area map information It4 or the in-building map information It8 in a manner similar to the foregoing case of the "Mode 1". Thereafter, the user 9 selects and determines one plan from the route plans with use of the operation device 2, as described above in FIGS. 4 and 5. Thus, a movement operation of the mobile body 1 starts in accordance with the determined route (movement route).

As described above, in this "Mode 6", only performing an operation (an operation of determining the move mode Mm and the movement route) on the operation device 2 in hand makes it possible to monitor the user 9 himself with use of the mobile body 1.

Operation in Other Move Mode Mm

It is to be noted that the following operation may be performed in the mobile body system 3 in move modes Mm other than these "Mode 1" to "Mode 6".

That is, first, for example, the information generator 17 or the information generator 27 may automatically generate, in the following manner, the route guidance information Ir1 or Ir2 used in a case where the mobile body 1 automatically moves along a street in a city (refer to an arrow M1 in FIG. 14), as illustrated in FIG. 14. In other words, the information generators 17 or 27 may generate the route guidance information Ir1 or Ir2 with use of, for example, the capture image data Di obtained by the imaging unit 113 of the mobile body 1, the position information Ip of the mobile body 1, and the map information Imap (It4) together with the various kinds of information (tag information) mentioned above. In such a case, it is possible to automatically generate map data generated by images taken in the city with use of the mobile body 1 in place of the user 9, thereby improving convenience of the user 9.

Herein, as illustrated in FIG. 14, for example, the following may be performed in a case where the captured image data Di, the position information Ip, and the map information Imap are stored together with the data update time information Idr regarding the captured image data Di in the external server 8, etc., while corresponding to the data update time information Idr. That is, the information generators 17 or 27 may automatically generate the route guidance information Ir1 or Ir2 with use of the data update time information Idr on a regular basis so as to automatically update the captured image data Di on a regular basis. For example, in the example in FIG. 14, a predetermined update period (for example, about several years) has expired with reference to the data update time information Idr in the captured image data Di(p) obtained in a past time at a certain point Pdr in a city; therefore, the following occurs. That is, the information generators 17 or 27 generates the route guidance information Ir1 or Ir2 in consideration also given to such information to obtain route plans via the point Pdr. Thereafter, the controller 18 of the mobile body 1 controls the imaging unit 113 in addition to the movement mechanism 10 so as to obtain the captured image data Di(n) at a present time at the point Pdr and automatically update data. In such a case, it is possible to automatically update map data generated by images taken in the city at a regular basis with use of the mobile body 1 in place of the user 9, which makes it possible to further improve convenience of the user 9.

Moreover, for example, the user interface unit 21 (the display unit 212) in the operation device 2 may output (supply) the following information to the user 9, as illustrated in FIG. 15. In other words, the display unit 212 may output respective pieces of position information Ip of a plurality of mobile bodies 1 (three mobile bodies 1, 1a, and 1b in this example) to the user 9 on the basis of information received from outside (the external information I21 from each of mobile bodies 1, or the external information I81 from the external server 8, etc.) It is to be noted that in this example, the display unit 212 displays, in addition to the position information Ip of the mobile body 1 as a target to be used (a target to be operated) by a certain user 9, the position information Ip of each of the other mobile bodies 1a and 1b located in a region around the mobile body 1 at the point in time together with the remaining electric power information It5 (remaining electric power expressed in percentage) of each of the mobile bodies 1, 1a, and 1b. In such a case, for example, in a case where various kinds of exchange are performed with other mobile bodies, or the like as with a modification example 1, etc. to be described later, useful information for the user 9 is obtained in an obviously easily understandable manner, thereby improving convenience of the user 9. It is to be noted that the respective foregoing mobile bodies 1a and 1b correspond to a specific example of "other mobile bodies" in the present disclosure.

Herein, for example, the information generator 17 or the information generator 27 may generate the route guidance information Ir1 or Ir2 used for movement to allow the mobile bodies 1, 1a, and 1b to come closer to one another by a shortest route with use of the position information Ip of each of the plurality of mobile bodies 1, 1a, and 1b, as indicated by an arrow in FIG. 15. In this example, the information generator 17 or 27 automatically generates the route guidance information Ir1 or Ir2 used for movement to allow the mobile body 1 to approach the mobile body 1b located near the mobile body 1 by a shortest route R4. It is to be noted that on this occasion, the information generator 17 or 27 may generate the route guidance information Ir1 or Ir2 by the shortest route R4 in consideration also given to the remaining electric power information It5 of each of the foregoing mobile bodies 1, 1a, and 1b. In these cases, it is possible to further improve convenience of the user 9 in a case where various kinds of exchange with other mobile bodies are performed, or the like, as described above.

It is to be noted that, in addition to these operations, for example, the following operation may be performed in the mobile body system 3.

An area that is reachable by the mobile body 1 with the remaining electric power Pb is displayed on a map.

An area where contactless electric power feeding is executable in the mobile body 1 is displayed on a map.

Information regarding a congestion state (a degree of congestion) in a route plan, etc. obtained by the route guidance information Ir1 or Ir2 is obtained from the external server 8, etc. and displayed on a map.

In the mobile body 1 according to the present embodiment, the information generator 17 generates the route guidance information Ir1 on the basis of the external information I21 and I81 received from outside, which makes it possible to easily create the route guidance information Ir1 in the mobile body 1. This makes it possible to improve convenience of the user 9.

Moreover, in the operation device 2 according to the present embodiment, the information generator 27 generates the route guidance information Ir2 on the basis of one or more pieces of information out of the external information I21 received from the mobile body 1, the input information Ii inputted by the user 9, and the held information Ih held in the storage unit 22, which makes it possible to easily create the route guidance information Ir2 in the operation device 2. This makes it possible to improve convenience of the user 9.

Further, these information generators 17 and 27 respectively generate the route guidance information Ir1 and Ir2 with use of a correspondence relationship between the mode setting information Im indicating the move mode Mm and various kinds of information (tag information) corresponding to each of the plurality of kinds of move modes Mm (for example, refer to FIG. 6), which makes it possible to achieve the following effect. That is, although reference information used for generation of the route guidance information Ir1 and Ir2 depends on intended use application of the mobile body 1, it is possible to automatically generate the route guidance information Ir1 and Ir2 suitable for various use applications (use cases) without setting, by the user 9, which information is a basis to generate the route guidance information Ir1 and Ir2. Specifically, it is only necessary for the user 9 to set the move mode Mm with use of the operation device 2, and it is possible to easily obtain suitable route guidance information Ir1 and Ir2 without selecting whether or not to use complicated tag information, etc., which makes it possible to significantly improve usability of the mobile body system 3 for the user 9.

2. Modification Examples

Next, description is given of modification examples (modification examples 1 to 3) of the foregoing embodiment. It is to be noted that the same components are denoted by the same reference numerals, and description thereof is omitted as appropriate.

Moreover, a first information processing method and a first information processing program according to each of these modification examples are embodied by a mobile body according to a corresponding one of the modification examples. Moreover, a second information processing method and a second information processing program according to each of the modification examples are embodied by an operation device (information processor) according to a corresponding one of the modification examples. Accordingly, these methods and programs are also described below.

Modification Example 1

Configuration

FIG. 16 illustrates a block diagram of each of a mobile body (mobile body 1A) and an operation device (operation device 2A) according to the modification example 1 as a configuration example of a mobile body system (mobile body system 3A) according to the modification example 1. In other words, the mobile body system 3A according to the present modification example includes the mobile body 1A and the operation device 2A. It is to be noted that the operation device 2A corresponds to a specific example of an "information processor" in the present disclosure.

The mobile body 1A corresponds to the mobile body 1 described in the foregoing embodiment further including a communication operation unit 15, and other configurations of the mobile body 1A are similar to those in the mobile body 1. The communication operation unit 15 has a function (communication function) of performing various kinds of communication operations with mobile bodies other than the mobile body 1A with use of wireless communication, as described in detail later.

The operation device 2A corresponds to the operation device 2 described in the foregoing embodiment provided with a controller 28A in place of the controller 28, and other configurations of the operation device 2A are similar to those of the operation device 2. The controller 28A corresponds to the controller 28 having a function (communication control function) of performing various kinds of control in the foregoing communication operations, and other configurations of the controller 28A are similar to those of the controller 28. Specifically, the controller 28A supplies, with use of the wireless communication C12, a control signal for a communication operation in the communication operation unit 15 of the mobile body 1A on the basis of, for example, an instruction signal related to the communication operation inputted to the operation device 2A by the user 9.

Herein, the controller 28A corresponds to a specific example of a "communication controller" in the present disclosure. Moreover, the controller 28A and the information generator 27 correspond to specific examples of a "computer in a information processor" in the present disclosure.

Operation, Workings, and Effects

In the communication operation unit 15 according to the present modification example, the communication operation with other mobile bodies is performed in accordance with communication control by the controller 28A in the following manner, for example. It is to be noted that a case where the mobile body 1A performs a predetermined communication operation with the other mobile body 1a illustrated in FIG. 15 mentioned above is described as an example.

Specifically, first, for example, as illustrated in FIG. 17, the communication operation unit 15 in the mobile body 1A may conduct, as such communication, negotiation with the other mobile body 1a to perform a predetermined operation. Herein, examples of this "predetermined operation" include transmission and reception operation of various kinds of information, a conversation operation (chatting operation), and an electric power feeding operation (wired or wireless electric power feeding operation) with the other mobile body 1a, and the predetermined operation may include one or more of these operations. It is to be noted that such mutual communication between such a mobile body 1A and the other mobile body 1A is performed through wireless communication C11 therebetween. It is possible to use any of various communication systems for the wireless communication C11 as with the foregoing wireless communication C12 and C18. Moreover, a mutual communication operation between such mobile bodies may be performed with use of various SNS (Social Networking Service) functions.

Herein, in the case of the foregoing electric power feeding operation, for example, it is possible for the mobile body 1A to receive electric power supply from the other mobile body 1a through contactless electric power feeding in accordance with a result of negotiation with the other mobile body 1a. Conversely, the mobile body 1A may supply electric power to the other mobile body 1a through contactless electric power feeding in accordance with a request from the other mobile body 1a. It is to be noted that after such electric power supply is executed, as an example of workings, the mobile body that supplies electric power may receive various kinds of points in return from the mobile body that receives the electric power. In such a case, for example, in case of an emergency caused by shortage of electric power, etc., it is possible to mutually exchange electric power by conducting communication (negotiation) between a plurality of mobile bodies, which improves convenience of the user 9. It is to be noted that the electric power feeding operation is not limited to the wireless electric power feeding (contactless electric power feeding), and a wired electric power feeding operation (an electric power feeding operation through plug-in connection) may be adopted; however, it is expected that a plug-in work by the mobile bodies (robots) is difficult; therefore, it is said that using contactless electric power feeding is desirable.

Moreover, as illustrated in FIG. 18, examples of the foregoing "predetermined operation" may include an operation of switching a mobile body to be used (to be operated) by the user 9. For example, an operation in which any other mobile body located around a recommended site is recommended on the basis of information regarding the user 9 (the information It1 regarding the GPS of the operation device 2, the search history information It2 in the operation device 2, etc. mentioned above), and the mobile body to be used (to be operated) is switched to the other mobile body, or the like is assumed as this switching operation. In this example, the mobile body to be used (to be operated) by the user 9 is switched from the mobile body 1A to the mobile body 1a through a communication operation (negotiation) between the mobile bodies 1A and 1a. In such a case, for example, in a case where a stroll is taken in another facility or another tourist site located at a distance from the mobile body 1A, or the like, effort (time) necessary for the mobile body 1A itself to move to the site is saved by the operation of switching the mobile body, which makes it possible to execute an efficient movement operation. This makes it possible to improve convenience of the user 9.

As described above, in the present modification example, various kinds of communication operations are performed between a plurality of mobile bodies (the communication function is provided), which makes it possible to further improve convenience of the user 9. It is to be noted that, in addition to the foregoing example, for example, various kinds of events such as a secret party through the mobile bodies (in which conversation between the mobile bodies is not leaked to its surroundings) and a marriage hunting party using the mobile body 1A in place of the user 9 may be held with use of such various kinds of communication operations between the plurality of mobile bodies.

Modification Examples 2 and 3

FIG. 19 illustrates a block diagram of each of a mobile body (mobile body 1 or mobile body 1A) and an operation device (operation device 2B) according to the modification example 2 as a configuration example of a mobile body system (mobile body system 3B) according to the modification example 2. In other words, the mobile body system 3B according to the present modification example includes the mobile body 1 (or the mobile body 1A) and the operation device 2B. It is to be noted that the operation device 2B corresponds to a specific example of an "information processor" in the present disclosure.

In the mobile body system 3B according to the modification example 2, while the foregoing information generator 17 is provided in the mobile body 1 (or the mobile body 1A), the foregoing information generator 27 is not provided in the operation device 2B, as illustrated in FIG. 19.

FIG. 20 illustrates a block diagram of each of a mobile body (mobile body 1C) and an operation device (operation device 2 or operation device 2A) according to the modification example 3 as a configuration example of a mobile body system (mobile body system 3C) according to the modification example 3. In other words, the mobile body system 3C according to the present modification example includes the mobile body 1C and the operation device 2 (or the operation device 2A).

In the mobile body system 3A according to the modification example 3, while the foregoing information generator 27 is provided in the operation device 2 (or the operation device 2A), the foregoing information generator 17 is not provided in the mobile body 1C, as illustrated in FIG. 20.

It is to be noted that in FIGS. 19 and 20, blocks other than the information generators 17 and 27 in the mobile bodies 1, 1A, and 1C and in the operation devices 2, 2A, and 2B are not illustrated for convenience of description.

Herein, in each of the mobile body systems 3 and 3A according to the embodiment and the modification example 1, the information generator 17 is provided in the mobile body 1 or 1A, and the information generator 27 is provided in the operation device 2 or 2A. However, as with these modification examples 2 and 3, only one of the information generator 17 in the mobile body 1, 1A, or 1C and the information generator 27 in the operation device 2, 2A, or 2B may be provided. In other words, in the mobile body system of the present disclosure, at least one of the information generator 17 and the information generator 27 may be provided.

Even in these cases, effects similar to those in the embodiment and the modification example 1 are basically achievable. In other words, at least one of the information generator 17 and the information generator 27 is provided, which makes it possible to easily create at least one of the route guidance information Ir1 and the route guidance information Ir2 in at least one of the mobile body and the operation device (the information processor). This makes it possible to improve convenience of the user 9.

3. Other Modification Examples

Although the technology of the present disclosure has been described above referring to some embodiments and modification examples, the present technology is not limited to these embodiments, etc., and may be modified in a variety of ways.

For example, in the foregoing embodiment, etc., configuration examples of the mobile body and the operation device (information processor) in the mobile body system have been described in detail; however, configurations of the mobile body and the operation device are not limited to these configuration examples. Specifically, for example, a portion of any of these configurations may be replaced with another configuration, or another configuration may be further provided. Moreover, the shape, size, position, number, etc. of each of configurations are not limited to those in the foregoing embodiment, etc., and may be any shape, size, position, number, etc.

More specifically, as the configuration of the movement mechanism applied to the mobile body of the present disclosure, for example, at least one of the walking mechanism, the wheel mechanism, and the flying mechanism described in the foregoing embodiment, etc. may be included. Alternatively, the movement mechanism may be configured with use of any other mechanism.

Further, the technique of generating the route guidance information by the information generator is not limited to the technique described in the foregoing embodiment, etc., and the route guidance information may be generated with use of any other technique (any other information).

Furthermore, the technique of controlling the operation of the movement mechanism by the controller is not limited to the technique described in the foregoing embodiment, etc., and the operation of the movement mechanism may be controlled with use of any other technique.

In addition, the technique of route suggestion with use of the generated route guidance information (such as a method of displaying route plans) is not limited to the technique described in the foregoing embodiment, etc., and route suggestion may be made to the user with use of, for example, an AR (Augmented Reality) function.

Moreover, the technique of the communication operation and control of the communication operation (communication control) are not limited to those described in the modification example 1, and communication operation and communication control may be performed with use of any other technique.

Further, in the foregoing embodiment, etc., description has been given by referring to the mobile body system including one mobile body and one operation device (information processor) as an example; however, the mobile body system is not limited to this example, and the mobile body system may be constructed by including a plurality of mobile bodies and a plurality of operation devices (information processors), for example.

In addition, the processes described in the foregoing embodiment, etc. may be executed by hardware (circuitry) or software (a program). In a case where the processes are executed by software, the software includes a group of programs used to execute respective functions by a computer. Each of the programs may be preinstalled into the foregoing computer and thereafter may be used, or each of the programs may be installed into the foregoing computer from a network or a recording medium and thereafter may be used.

Moreover, various examples described above may be applied in any combination.

It is to be noted that the effects described herein are merely exemplified and non-limiting, and effects achieved by the technology may be effects other than those described herein.

Moreover, the present technology may have the following configurations.

(1)

A mobile body comprising:

an imaging unit;

a movement mechanism that moves itself;

a wireless communication unit that performs wireless communication; and an information generator that generates, on a basis of external information received from outside by the wireless communication unit, route guidance information for use in allowing the movement mechanism to move itself.

(2)

The mobile body according to (1), in which the external information is inherent information held in an information processor as an operation device for the mobile body.

(3)

The mobile body according to (2), in which the inherent information includes one or both of information regarding a GPS and search history information in the information processor.

(4)

The mobile body according to any one of (1) to (3), in which a plurality of kinds of move modes used for movement by the movement mechanism are provided, and the external information is used in accordance with the move mode set by a user.

(5)

The mobile body according to (4), in which the information generator generates the route guidance information with use of a correspondence relationship between mode setting information indicating the move mode and information including the external information corresponding to each of the plurality of kinds of move modes.

(6)

The mobile body according to (4) or (5), in which the information generator further uses movement history information in the mobile body to generate the route guidance information.

(7)

The mobile body according to any one of (1) to (6), in which the information generator further uses captured image data obtained by the imaging unit, position information of the mobile body, and map information to generate the route guidance information.

(8)

The mobile body according to (7), in which the captured image data, the position information, and the map information are stored together with data update time information regarding the captured image data while corresponding to the data update time information, and the information generator automatically generates the route guidance information on a regular basis with use of the data update time information to update the captured image data on a regular basis.

(9)

The mobile body according to (7) or (8), further including an anomaly detector that compares a same point between the captured image data obtained at a present time and the captured image data obtained at a past time with use of the position information and the map information to detect an anomaly.

(10)

The mobile body according to any one of (1) to (9), further including a communication operation unit that performs communication with other mobile bodies with use of the wireless communication.

(11)

The mobile body according to (10), in which the communication operation unit performs, as the communication, negotiation with the other mobile bodies to perform a predetermined operation.

(12)

The mobile body according to (11), in which the predetermined operation includes one or more of information transmission-reception operation, a conversation operation, an electric power feeding operation, and a switching operation of the mobile body to be used by a user.

(13)

The mobile body according to any one of (1) to (12), further including a movement controller that controls a movement operation by the movement mechanism.

(14)

The mobile body according to (13), in which a solar cell used as a power source of the mobile body is provided, and the movement controller controls the movement mechanism to cause the mobile body to preferentially move outdoors during daylight hours.

(15)

The mobile body according to (13) or (14), further including a position detector that detects whether the mobile body is located in an area where the wireless communication is executable, in which the movement controller controls the movement mechanism to cause the mobile body to move to inside of the area in a case where the position detector detects that the mobile body is not located in the area.

(16)

The mobile body according to any one of (13) to (15), in which the movement controller controls the movement mechanism to cause the mobile body to automatically move on a basis of preset schedule information.

(17)

The mobile body according to any one of (1) to (16), in which the information generator generates the route guidance information with consideration also given to action history information of a user obtained in a standby state of the mobile body.

(18)

The mobile body according to any one of (1) to (17), in which one or more pieces of the route guidance information generated by the information generator are provided to a user through the wireless communication, and the movement mechanism moves the mobile body on a basis of a route determined by the user.

(19)

The mobile body according to any one of (1) to (18), in which the movement mechanism includes one or more of a walking mechanism, a wheel mechanism, and a flying mechanism.

(20)

The mobile body according to (19), in which the movement mechanism includes one of the wheel mechanism and the walking mechanism, and the information generator generates the route guidance information while avoiding a route having a level difference.

(21)

An information processor including:

a wireless communication unit that performs wireless communication with a mobile body including an imaging unit and a movement mechanism;

a user interface unit;

a storage unit; and an information generator that generates route guidance information for use in moving the mobile body by the movement mechanism on a basis of one or more pieces of information out of received information received from the mobile body by the wireless communication unit, input information inputted by a user in the user interface unit, and held information held in the storage unit.

(22)

The information processor according to (21), in which the information generator generates the route guidance information on a basis of the received information, the input information, and the held information.

(23)

The information processor according to (21) or (22), in which the received information includes movement history information in the mobile body, the input information includes search history information in the information processor, and the held information includes information regarding a GPS in the information processor.

(24)

The information processor according to any one of (21) to (23), in which the user interface unit outputs, to a user, each of position information of a plurality of the mobile bodies on a basis of the received information.

(25)

The information processor according to (24), in which the information generator uses each of the position information of the plurality of the mobile bodies to generate the route guidance information for use in allowing the mobile bodies to come closer to one another by a shortest route.

(26)

The information processor according to (25), in which the information generator generates the route guidance information by the shortest route in consideration of remaining electric power information of the mobile body as the received information.

(27)

The information processor according to any one of (24) to (26), further including a communication controller that controls a communication operation performed between the plurality of the mobile bodies with use of the wireless communication.

(28)

A mobile body system including:

a mobile body including an imaging unit, a first wireless communication unit, and a movement mechanism that moves itself; and an information processor including a second wireless communication unit, a user interface unit, and a storage unit, the second wireless communication unit that performs wireless communication with the mobile body, in which one or both of a first information generator in the mobile body and a second information generator in the information processor are provided, the first information generator that generates first information as route guidance information for use in moving the mobile body by the movement mechanism on a basis of external information received from outside by the first wireless communication unit, and the second information generator that generates second information as the route guidance information on a basis of one or more pieces of information out of received information received from the mobile body by the second wireless communication unit, input information inputted by a user in the user interface unit, and held information held in the storage unit.

(29)

The mobile body system according to (28), in which the first information generator is provided in the mobile body, and the second information generator is provided in the information processor.

(30)

An information processing method including:

a first step of receiving external information from outside through wireless communication in a mobile body including an imaging unit and a movement mechanism; and a second step of generating route guidance information for use in moving the mobile body by the movement mechanism on a basis of the external information received in the first step.

(31)

An information processing method including:

a first step of obtaining one or more pieces of information out of received information received from a mobile body including an imaging unit and a movement mechanism through wireless communication with the mobile body, input information inputted from a user in a user interface unit in an information processor, and held information held in a storage unit in the information processor; and a second step of generating route guidance information for use in moving the mobile body by the movement mechanism on a basis of the one or more pieces of information obtained in the first step.

(32)

An information processing program causing, when executed by a computer in a mobile body, the computer to implement:

a first step of receiving external information from outside through wireless communication in the mobile body including an imaging unit and a movement mechanism; and a second step of generating route guidance information for use in moving the mobile body by the movement mechanism on a basis of the external information received in the first step.

(33)

An information processing program causing, when executed by a computer in an information processor, the computer to implement:

a first step of obtaining one or more pieces of information out of received information received from a mobile body including an imaging unit and a movement mechanism through wireless communication with the mobile body, input information inputted from a user in a user interface unit in the information processor, and held information held in a storage unit in the information processor; and a second step of generating route guidance information for use in moving the mobile body by the movement mechanism on a basis of the one or more pieces of information obtained in the first step.

The present application is based on and claims priority from Japanese Patent Application No. 2015-160051 filed in the Japan Patent Office on Aug. 14, 2015, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing method of an information processor, the method comprising:

obtaining information inputted by a user using a user interface of the information processor and information received from a mobile body through a wireless communication, the mobile body including a movement mechanism and an imaging unit configured to capture image data, the information received from the mobile body including captured image data obtained by the imaging unit, with the captured image data being updated periodically; and generating route guidance information for use in moving the mobile body autonomously by the movement mechanism, the route guidance information being generated based on the captured image data, position information of the mobile body, and map information,
wherein the route guidance information includes at least two selectable routes,
wherein the captured image data, the position information, and the map information are stored together with data update time information regarding the captured image data, with the map information being automatically updated, and
wherein the route guidance information is automatically generated based on the data update time information, with updated image data being stored as the captured image data.

2. The information processing method according to claim 1, wherein the information received from the mobile body includes inherent information held in an information processor employed as an operation device for the mobile body.

3. The information processing method according to claim 2, wherein the inherent information includes one or both of: information regarding a GPS and search history information in the information processor.

4. The information processing method according to claim 1, wherein movement history information is used to generate the route guidance information.

5. The information processing method according to claim 1, further comprising:
comparing a same point between the captured image data and a previous captured image data, obtained at a past time, with use of the position information and the map information to detect an anomaly.

6. The information processing method according to claim 1, further comprising:
communicating wirelessly with other mobile bodies.

7. The information processing method according to claim 6, wherein the communicating with the other mobile bodies is comprised of negotiating with the other mobile bodies to perform a predetermined operation.

8. The information processing method according to claim 7, wherein the predetermined operation includes any one or any combination of: an information transmission-reception operation, a conversation operation, an electric power feeding operation, and a switching operation of the mobile body.

9. The information processing method according to claim 1, further comprising:
controlling a movement operation by the movement mechanism.

10. The information processing method according to claim 9, wherein:
a solar cell is used as a power source of the mobile body, and
the controlling by the movement mechanism causes the mobile body preferentially to move autonomously outdoors during daylight hours.

11. The information processing method according to claim 9, further comprising:
detecting whether the mobile body is located in an area where a wireless communication is executable,
wherein the controlling by movement mechanism causes the mobile body to move autonomously to inside of the area in a case where the detecting detects that the mobile body is not located in the area.

12. The information processing method according to claim 9, wherein the controlling by movement mechanism causes the mobile body to begin autonomous movement automatically on a basis of preset schedule information.

13. The information processing method according to claim 1, wherein the generating of the route guidance information is performed based on action history information of a user obtained during a standby state of the mobile body.

14. The information processing method according to claim 1, further comprising:
providing at least one piece of the route guidance information to a user through a wireless communication,
wherein the movement mechanism moves the mobile body autonomously on a basis of a route determined by the user.

15. The information processing method according to claim 1, wherein the movement mechanism includes any one or any combination of: a walking mechanism, a wheel mechanism, and a flying mechanism.

16. The information processing method according to claim 15, wherein:
the movement mechanism includes the wheel mechanism or the walking mechanism, and
the generating of the route guidance information generates the route guidance information to avoid a route having a level difference.

17. A mobile body comprising:
a movement mechanism configured to move the mobile body;
an imaging unit configured to capture image data and to update the captured image data periodically; and
circuitry configured to:
wirelessly transmit information to an information processor external to the mobile body, the transmitted information including the capture image data, and
wirelessly receive information from the information processor, the received information including route guidance information for use in allowing the movement mechanism to move the mobile body based on the captured image data,
wherein the captured image data, the position information, and map information are stored together with data update time information regarding the captured image data, with updated image data being stored as the captured image data, and with the map information being updated automatically, and
wherein the route guidance information:
is used by the movement mechanism to move the mobile body autonomously,
includes at least two selectable routes, and
is automatically generated by the information processor based on the data update time information, the captured image data, position information of the mobile body, and the map information.

18. An information processor comprising:
an interface configured to enable a user to input information; and
at least one computer processor configured to:
obtain the information inputted by the user and information received from a mobile body through a wireless communication, the mobile body including a movement mechanism and an imaging unit configured to capture image data, the information received from the mobile body including captured image data obtained by the imaging unit, with the captured image data being updated periodically; and
generate route guidance information for use in moving the mobile body autonomously by the movement mechanism, the route guidance information being generated based on the captured image data, position information of the mobile body, and map information, wherein the route guidance information includes at least two selectable routes, wherein the captured image data, the position information, and the map information are stored together with data update time information regarding the captured image data, with the map information being automatically updated, and wherein the route guidance information is automatically generated with use of the data update time information, with updated image data being stored as the captured image data.

19. A mobile body system comprising:

a mobile body; and an information processor, wherein the mobile body includes:
- a movement mechanism configured to move the mobile body,
- an imaging unit configured to capture image data and to update the captured image data periodically, and
- circuitry configured to:
  - wirelessly transmit the capture image data to the information processor, and
  - wirelessly receive from the information processor route guidance information for use in allowing the movement mechanism to move the mobile body based on the captured image data, wherein the information processor includes:
- an interface configured to enable a user to input information; and
- at least one computer processor configured to:
  - obtain the information inputted by the user and information received from the mobile body through a wireless communication, the information received from the mobile body including the captured image data obtained by the imaging unit, with the captured image data being updated periodically, and
  - generate route guidance information for use in moving the mobile body autonomously by the movement mechanism, the route guidance information being generated based on the captured image data, position information of the mobile body, and map information, wherein the captured image data, the position information, and the map information are stored together with data update time information regarding the captured image data, with updated image data being stored as the captured image data, and with the map information being updated automatically, and wherein the route guidance information:
- is used by the movement mechanism to move the mobile body autonomously,
- includes at least two selectable routes, and
- is automatically generated by the information processor based on the data update time information, the captured image data, position information of the mobile body, and the map information.

20. A non-transitory computer-readable storage medium storing code for an information processor that, when executed by a computer processor of the information processor, causes the information processor to perform a method comprising:

obtaining information inputted by a user using a user interface of the information processor and information received from a mobile body through a wireless communication, the mobile body including a movement mechanism and an imaging unit configured to capture image data, the information received from the mobile body including captured image data obtained by the imaging unit, with the captured image data being updated periodically; and generating route guidance information for use in moving the mobile body autonomously by the movement mechanism, the route guidance information being generated based on the captured image data, position information of the mobile body, and map information, wherein the route guidance information includes at least two selectable routes, wherein the captured image data, the position information, and the map information are stored together with data update time information regarding the captured image data, with the map information being automatically updated, and wherein the route guidance information is automatically generated with use of the data update time information, with updated image data being stored as the captured image data.

* * * * *